US012627452B2

(12) United States Patent
Wong et al.

(10) Patent No.: US 12,627,452 B2
(45) Date of Patent: May 12, 2026

(54) COMMUNICATIONS DEVICES, NETWORK INFRASTRUCTURE EQUIPMENT, WIRELESS COMMUNICATIONS NETWORKS AND METHODS

(71) Applicant: Sony Group Corporation, Tokyo (JP)

(72) Inventors: Shin Horng Wong, Basingstoke (GB); Naoki Kusashima, Tokyo (JP)

(73) Assignee: Sony Group Corporation, Tokyo (JP)

( * ) Notice: Subject to any disclaimer, the term of this patent is extended or adjusted under 35 U.S.C. 154(b) by 610 days.

(21) Appl. No.: 18/013,250

(22) PCT Filed: Jul. 22, 2021

(86) PCT No.: PCT/EP2021/070615
§ 371 (c)(1),
(2) Date: Dec. 28, 2022

(87) PCT Pub. No.: WO2022/023186
PCT Pub. Date: Feb. 3, 2022

(65) Prior Publication Data
US 2023/0336314 A1      Oct. 19, 2023

(30) Foreign Application Priority Data
Jul. 27, 2020      (EP) .................................... 20187993

(51) Int. Cl.
*H04L 5/00*          (2006.01)
*H04L 1/1812*        (2023.01)
(Continued)

(52) U.S. Cl.
CPC .......... *H04L 5/0055* (2013.01); *H04L 1/1812* (2013.01); *H04W 72/232* (2023.01); *H04W 72/56* (2023.01)

(58) Field of Classification Search
CPC .... H04L 5/0055; H04L 1/1812; H04W 72/56; H04W 72/232
See application file for complete search history.

(56) References Cited

U.S. PATENT DOCUMENTS

2012/0063400 A1*   3/2012   Papasakellariou .... H04L 1/1812
                                                  370/329
2012/0155337 A1*   6/2012   Park ...................... H04L 1/1692
                                                  370/280
(Continued)

FOREIGN PATENT DOCUMENTS

CN          104798429 A      7/2015
CN          107517096 A      12/2017
(Continued)

OTHER PUBLICATIONS

International Search Report and Written Opinion mailed on Oct. 27, 2021, received for PCT Application PCT/ EP2021/070615, filed on Jul. 22, 2021, 10 pages.
(Continued)

*Primary Examiner* — Jael M Ulysse
(74) *Attorney, Agent, or Firm* — XSENSUS LLP

(57) ABSTRACT
A method of receiving data at a communications device from a wireless communications network is provided. The method comprises receiving downlink control information indicating an allocation of downlink communications resources of a wireless access interface provided by the wireless communications network for receiving downlink data, the downlink control information also providing an indication of a relative priority associated with the received downlink data, and receiving the downlink data from the allocated downlink communications resources.

18 Claims, 18 Drawing Sheets

(51) Int. Cl.
     H04W 72/232          (2023.01)
     H04W 72/56           (2023.01)

(56) References Cited

U.S. PATENT DOCUMENTS

| | | | |
|---|---|---|---|
| 2015/0181571 A1* | 6/2015 | Park | H04W 52/0216 |
| | | | 370/252 |
| 2016/0285595 A1* | 9/2016 | Chen | H04L 5/0055 |
| 2017/0034850 A1* | 2/2017 | Rico Alvarino | H04L 1/08 |
| 2017/0079013 A1* | 3/2017 | Noh | H04L 1/1825 |
| 2017/0207895 A1* | 7/2017 | Yang | H04W 72/23 |
| 2018/0176903 A1* | 6/2018 | Lee | H04W 72/04 |
| 2018/0198567 A1* | 7/2018 | Huss | H04L 5/001 |
| 2018/0302916 A1* | 10/2018 | Lee | H04L 5/0012 |
| 2019/0223190 A1* | 7/2019 | Hwang | H04L 1/1861 |
| 2019/0246416 A1* | 8/2019 | Park | H04W 72/21 |
| 2019/0306922 A1 | 10/2019 | Xiong | |
| 2019/0327755 A1 | 10/2019 | Xiong | |
| 2019/0373603 A1 | 12/2019 | Choi | |
| 2020/0028629 A1* | 1/2020 | Xue | H04L 1/1864 |
| 2020/0028632 A1* | 1/2020 | Iyer | H04L 1/1861 |
| 2020/0092853 A1* | 3/2020 | Lee | H04W 72/23 |
| 2020/0328849 A1* | 10/2020 | Noh | H04L 1/1812 |
| 2020/0336255 A1* | 10/2020 | Wong | H04W 72/0446 |

FOREIGN PATENT DOCUMENTS

| | | |
|---|---|---|
| CN | 109804584 A | 5/2019 |
| CN | 110771247 A | 2/2020 |

OTHER PUBLICATIONS

NTT DOCOMO, Inc., "Revised WID on New Radio Access Technology", 3GPP TSG RAN Meeting #78, RP-172834, Dec. 18-21, 2017, 11 pages.

Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.

Huawei et al., "New WID: Physical Layer Enhancements for NR Ultra-Reliable and Low Latency Communication (URLLC)", 3GPP TSG RAN Meeting #83, RP-190654, Mar. 18-21, 2019, 5 pages.

NTT DOCOMO, "New SID Proposal: Study on New Radio Access Technology", 3GPP TSG RAN Meeting #71, RP-160671, Mar. 7-10, 2016, 8 pages.

Holma et al., "LTE for Umts Ofdma and SC-FDMA Based Radio Access", John Wiley & Sons, 2009, 232 pages.

Ericsson, "HARQ Enhancement", 3GPP TSG-RAN WG1 Meeting #101-e, R1-2003845, May 25-Jun. 5, 2020, pp. 1-9.

Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.

Qualcomm Inc., "Revised WID on NR-based Access to Unlicensed Spectrum", 3GPP TSG RAN Meeting #84, RP-191575, Jun. 3-6, 2019, 8 pages.

Nokia et al., "New WID on enhanced Industrial Internet of Things (IoT) and URLLC support", 3GPP TSG RAN Meeting #86, RP-193233, Dec. 9-12, 2019, 5 pages.

3GPP, "Study on Scenarios and Requirements for Next Generation Access Technologies; (Release 14)", 3GPP TR 38.913 V14.3.0, Jun. 2017, pp. 1-39.

3GPP, "NR; Multiplexing and channel coding (Release 16)", 3GPP TS 38.212 V16.1.0, Mar. 2020, pp. 1-146.

3GPP, "NR; Multiplexing and channel coding (Release 16)", 3GPP TS 38.212 V16.0.0, Dec. 2019, pp. 1-145.

Ericsson, "Other Enhancements to Uplink and Downlink Transmissions for NR URLLC" 3GPP tsg_ran\wg1_rl1, No. tsgr1_99, Nov. 9, 2019, 5 pgs.

* cited by examiner

Contention Window 902      900      904

Type 2A     Device 1 Tx   CCA   Device 2 Tx

25 μs

Type 2B     Device 1 Tx   CCA   Device 2 Tx

16 μs

Type 2C     Device 1 Tx   Gap   Device 2 Tx

16 μs      Up to 584 μs

COT

S1910 — Receive DCI

S1920 — Receive Downlink Data

S1930 — Determine whether data was received

S1940 — Generate HARQ ACK or NACK

S1950 — Determine uplink resources for transmitting HARQ-ACK are not available

S1960 — Use transmission rules to identify next available uplink resources

S1970 — Use priority to determine whether HARQ-ACK can be transmitted in the next available uplink resources

COMMUNICATIONS DEVICES, NETWORK INFRASTRUCTURE EQUIPMENT, WIRELESS COMMUNICATIONS NETWORKS AND METHODS

CROSS-REFERENCE TO RELATED APPLICATIONS

The present application is based on PCT filing PCT/EP2021/070615, filed Jul. 22, 2021, which claims the Paris Convention priority of European patent application number EP20187993.9, filed Jul. 27, 2020, the content of each is incorporated in entirety by reference.

BACKGROUND

Field

The present disclosure relates to communications devices, network infrastructure equipment, wireless communications networks and methods. Embodiments can provide improvements in or relating wireless communications system operating to communicate data using automatic repeat request protocols such as hybrid automatic repeat request protocols (HARQ).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems are able to support a wider range of services than simple voice and messaging services offered by earlier generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected efficiently to support communications with an ever-increasing range of devices and data traffic profiles than existing systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of a desire to support new types of devices with a variety of applications there is expected to be a desire for future wireless communications networks to support connectivity more efficiently for a wide range of devices associated with different applications and different characteristic data traffic profiles and requirements. For example future wireless communications networks and systems such as those being developed by the 3$^{rd}$ Generation Project Partnership (3GPP), which may be referred to as 5G or new radio (NR) systems/new radio access technology (RAT) systems, as well as future iterations/releases of existing systems aim to introduce new developments and techniques to support new applications.

Example use cases currently being considered for next and latest generation wireless communication systems include so-called Ultra Reliable and Low Latency Communications (URLLC)/enhanced Ultra Reliable and Low Latency Communications (eURLLC). See, for example, the 3GPP documents RP-160671, "New SID Proposal: Study on New Radio Access Technology," NTT DOCOMO, RAN #71 [1]; RP-172834, "Work Item on New Radio (NR) Access Technology," NTT DOCOMO, RAN #78 [2]; RP-182089, "New SID on Physical Layer Enhancements for NR Ultra-Reliable and Low Latency Communication (URLLC)," Huawei, HiSilicon, Nokia, Nokia Shanghai Bell, RAN #81 [3]; and RP-190654, "Physical layer enhancements for NR ultra-reliable and low latency communication (URLLC)," Huawei, HiSilicon, RAN #89, Shenzhen, China, 18 to 21 Mar. 2019 [4].

URLLC services are low latency and high reliability services (e.g. to support applications such as factory automation, transport industry, electrical power distribution etc.). URLLC services might, for example, aim to transmit data through a radio network with a target 32-byte packet transit time (i.e. time from ingress of a layer 2 packet to its egress from the network) of 1 ms (i.e. so that each packet needs to be scheduled and transmitted across the physical layer in a time that is shorter than 1 ms) with 99.999% reliability within the 1 ms target packet transit time [5], and there are recent proposals for this to be increased to 99.9999% with a latency between 0.5 ms and 1 ms.

The 3GPP project has recently completed a Release-16 Work Item on eURLLC [6] to specify features that require high reliability and low latency such as factory automation, transport industry, electrical power distribution, etc. in a 5G system. The eURLLC feature is further enhanced in Release-17 in a new Work Item [7], where one of the objectives is to enhance acknowledgment signalling (HARQ-ACK feedback) in respect of URLLC downlink transmissions.

SUMMARY

The present disclosure can help address or mitigate at least some of the issues discussed above.

Embodiments of the present technique can provide in one example a communications device operating a method of receiving data from a wireless communications network. The method comprises receiving downlink control information indicating an allocation of downlink communications resources of a wireless access interface provided by the wireless communications network for receiving downlink data, the downlink control information also providing an indication of a relative priority associated with the received downlink data, and receiving the downlink data from the allocated downlink communications resources. According to an automatic repeat request process, the communications device then performs the steps of determining whether the downlink data was successfully received, and generating an automatic repeat request acknowledgement or negative acknowledgement, HARQ-ACK, in accordance with whether or not the downlink data was successfully received.

The communications device then performs the steps of determining that uplink communications resources for transmitting the HARQ-ACK are not available, using transmission rules to identify next available uplink communications resources presenting an opportunity for transmitting the HARQ-ACK, and using the indication of the relative priority associated with the received downlink data to determine whether the communications device can transmit the HARQ-ACK in the next available uplink communications resources as the resource opportunity to transmit the HARQ-ACK.

For example, the uplink communications resources for transmitting the HARQ-ACK may not be available because the communications device may be operating with a wireless communications network using an unlicensed frequency band and so must access communications resources of the uplink and the downlink using a contentious access procedure. As such the contentious access procedure may fail when the communications device is accessing the uplink communications resources which may have been allocated for transmitting the HARQ-ACK. In another example a codebook of procedure using by the HARQ process may use an indication in the downlink control information that no uplink communications resources have currently been allocated for transmission of the HARQ-ACK.

Embodiments can therefore provide an arrangement for transmitting a HARQ-ACK but utilising next available communications resources of the uplink according to the transmission rules which can differentiate a priority for using those resources with respect to other transmissions.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
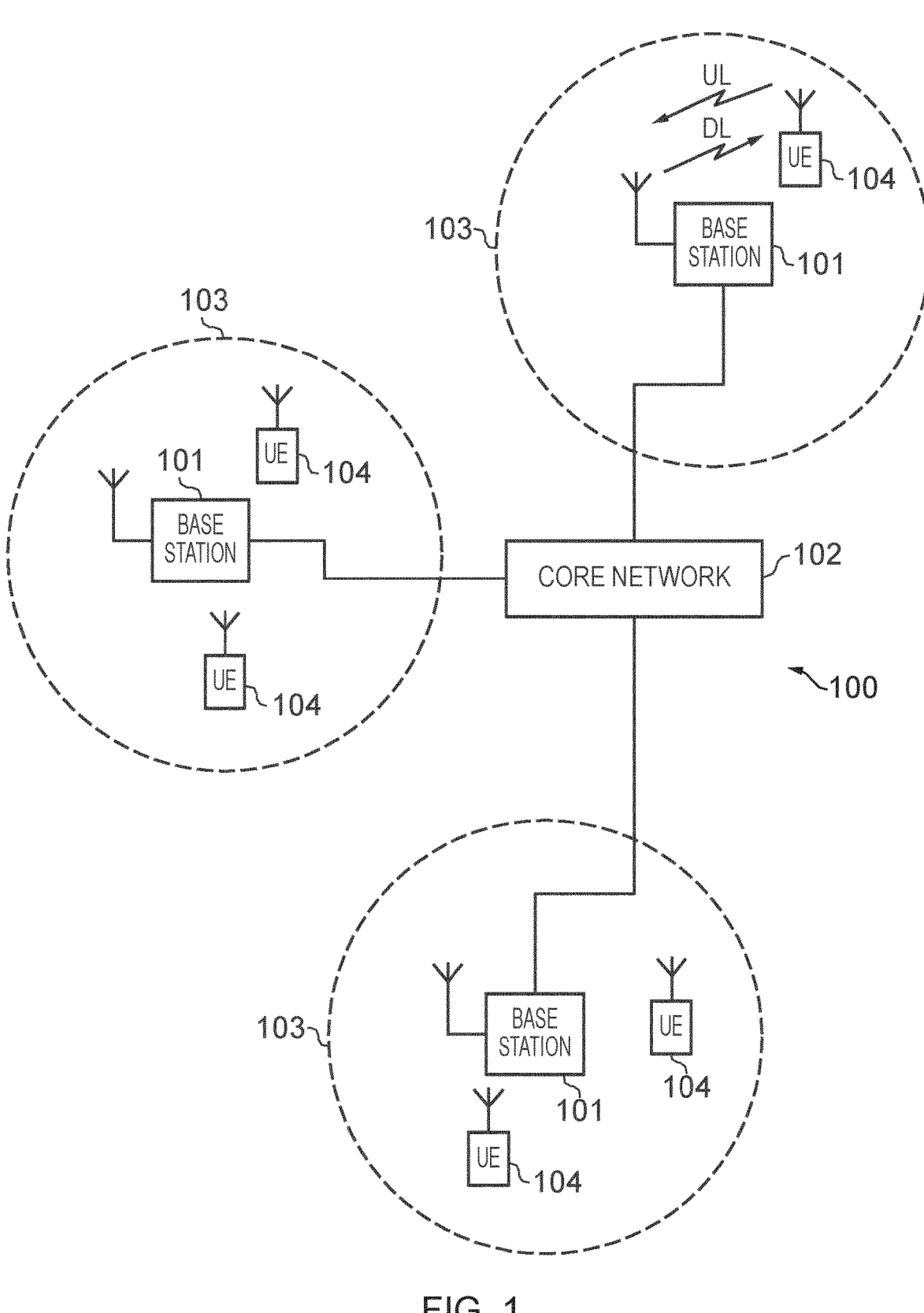
FIG. 1 schematically represents some aspects of an LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [11]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink (DL). Data is transmitted from terminal devices 104 to the base stations 101 via a radio uplink (UL). The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
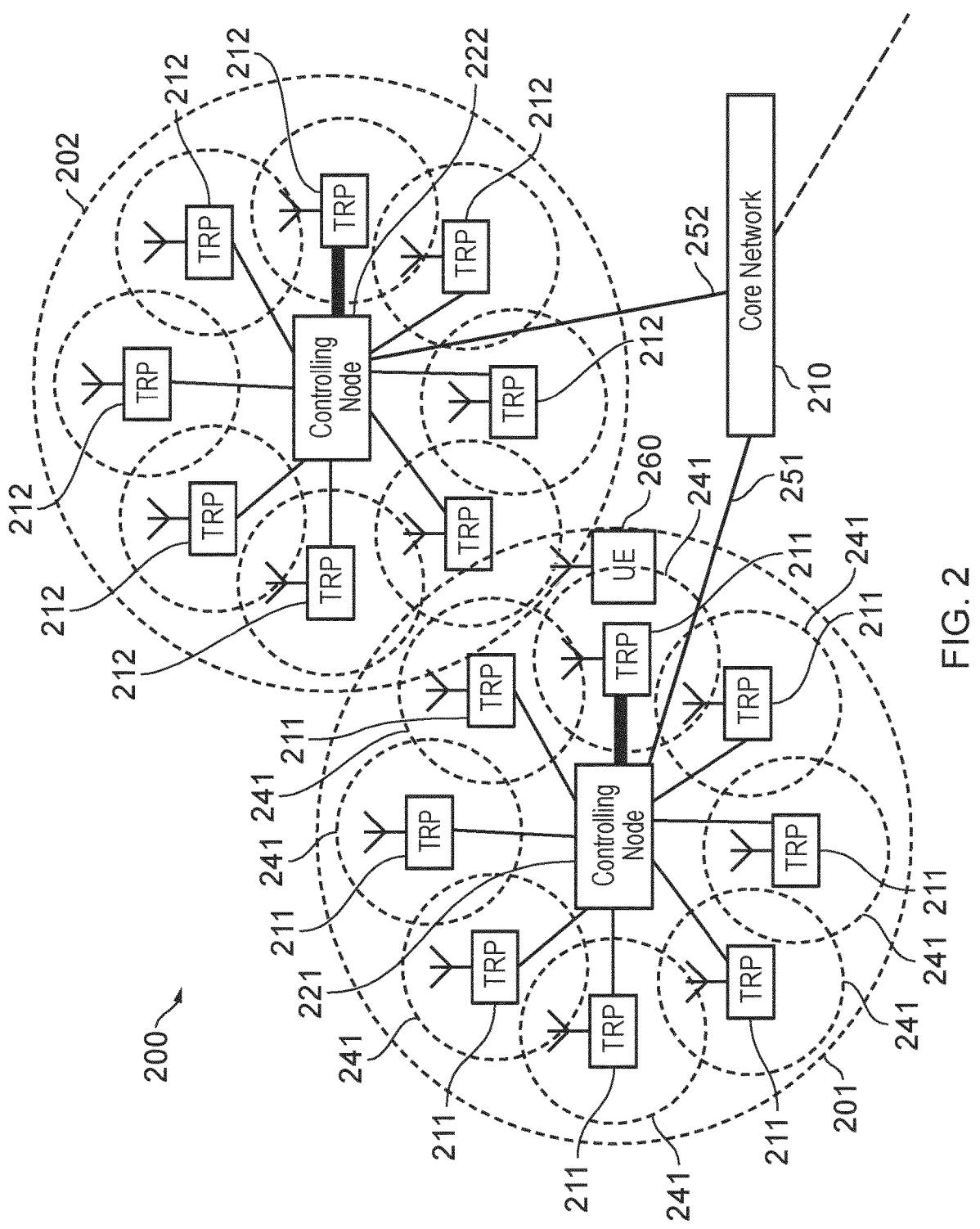
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

7

Figure 3:
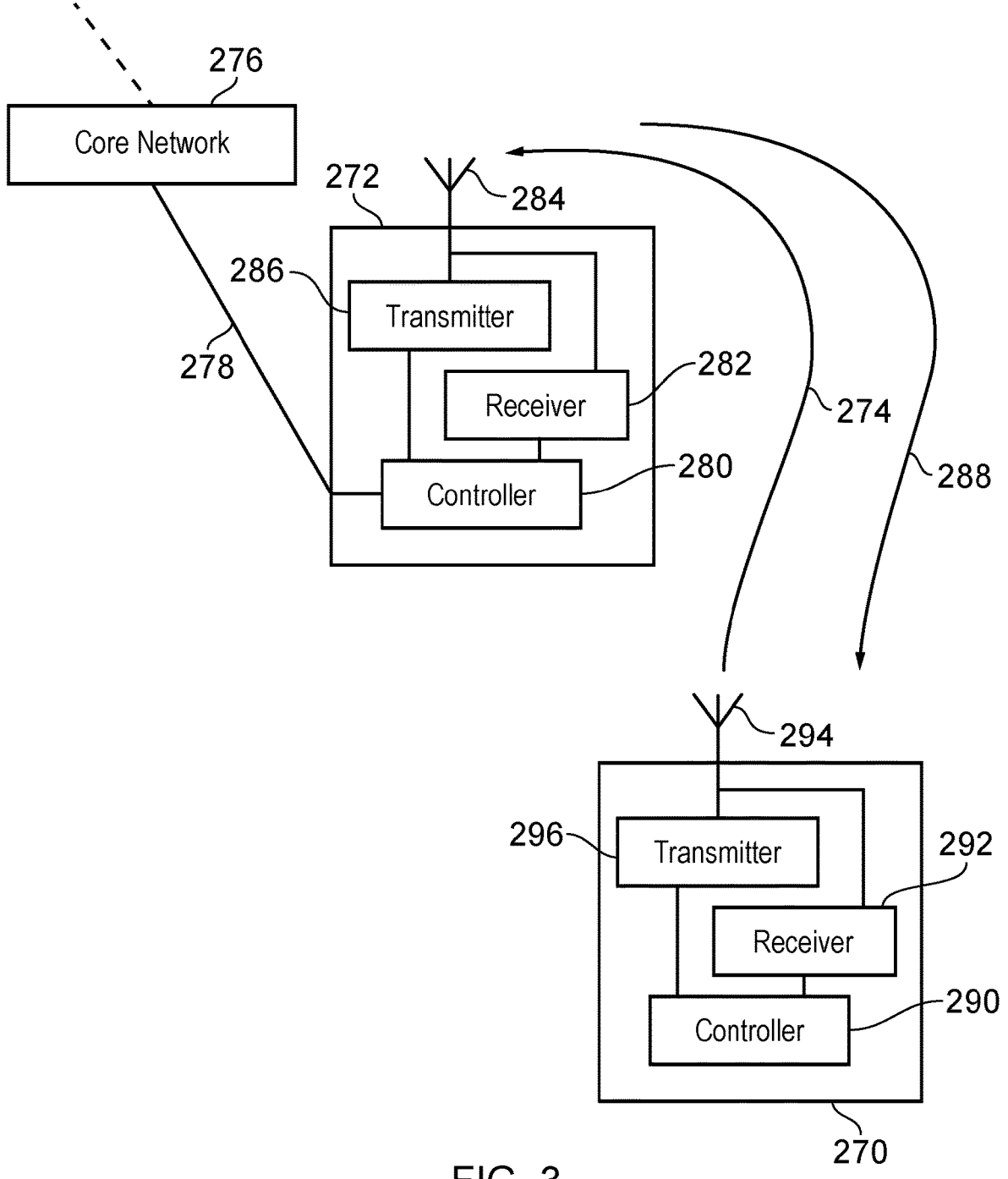
FIG. 3 shows a schematic representation of a telecommunications system in accordance with certain embodiments of the present disclosure.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to receive downlink data from the infrastructure equipment 272 via resources of a wireless access interface as illustrated generally by an arrow 274. The UE 270 receives the downlink data transmitted by the infrastructure equipment 272 via communications resources of the wireless access interface (not shown). As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Example Services

As mentioned above, there are a variety of services which may be supported by wireless communications networks. Development of physical layer, radio access and media access protocols and techniques can be adapted to support such services. Example services which are being defined for 5G/New Radio (NR) are the Ultra-Reliable and Low Latency Communications (URLLC) and the enhanced Mobile BroadBand (eMBB) services. URLLC has very low latency and high reliability where a URLLC data packet (e.g. 32 bytes) is required to be transmitted from the radio protocol layer ingress point to the radio protocol layer egress point of the radio interface within 1 ms with a reliability of 99.999% [5] to 99.9999%. On the other hand, eMBB requires high data rate of for example 20 Gbps with moderate latency and reliability (e.g. 99% to 99.9%).

Example developments for 3GPP are eURLLC [6] and NR Unlicensed (NR-U) [8]. For the example of eURLLC proposals have been made to specify features for high reliability and low latency services such as factory automation, transport industry, electrical power distribution, etc. in a 5G system. Unlicensed radio frequency resources refers to a concept in which the radio resources are not exclusively allocated to a particular operator or radio communications system but are shared between systems, which to some extent compete for these resources. An example application for unlicensed spectrum is a 3GPP Release-16 NR-U work item which specifies features which include incorporating Listen Before Talk (LBT) in NR frame structure to enable NR operation in unlicensed bands.

Further developments of eURLLC have been proposed for 3GPP Release-17 in a work item [7] where one of the objectives is to incorporate characteristics associated with communicating via unlicensed radio resources, which thereby enable eURLLC operation in an unlicensed band.

One aspect which should be addressed for use of eURLLC in an unlicensed frequency resource is HARQ-ACK feedback for PDSCH.

PDSCH HARQ-ACK Feedbacks

Certain embodiments of the disclosure relate to apparatus and methods for handling acknowledgment signalling (e.g. HARQ-ACK signalling) in respect of transmissions of data in a wireless telecommunications system. Acknowledgment signalling is used in wireless telecommunications systems to indicate whether a transmission was successfully received or not. If the transmission was successfully received the receiving entity will send positive acknowledgment signalling (i.e. an ACK), and if the transmission was not successfully received the intended recipient entity will send negative acknowledgment signalling (i.e. a NACK). The term acknowledgment signalling will be used herein to refer collectively to both positive acknowledgment signalling (i.e. ACK) and negative acknowledgment signalling (i.e. NACK).

For scheduled transmission of data from a network access node (base station) to a communications device in a wireless telecommunications system it is common for the network access node to first send control signalling, e.g. on a downlink control channel (such as a PDCCH—Physical Downlink Control Channel), comprising downlink control information (DCI) which indicates (grants) downlink radio resources that are to be used to transmit the data, e.g. on a downlink shared channel (such as a PDSCH). From this the communications device can determine uplink radio resources to use to send uplink control information (UCI) comprising acknowledgment signalling in respect of the data, e.g. on an uplink control channel (such as a PUCCH), although it may also be on an uplink shared channel (such as a PUSCH). The communications device then seeks to receive the data on the indicated radio resources on the downlink shared channel. If the communications device successfully decodes the data it transmits a UCI on the determined uplink radio resources comprising an ACK indication, and if the communications device does not successfully decode the data it transmits a UCI on the determined uplink radio resources comprising a NACK indication. This allows the network access node to determine if it should schedule a retransmission of the data.

So as to provide some particular examples, certain embodiments of the disclosure will be described herein in the context of acknowledgement signalling for downlink transmissions of URLLC data and using terminology, for example in respect of channel names such as PUCCH and PDSCH and signalling names, such as DCI and UCI, which are typically used in connection with current 3GPP wireless telecommunications systems. However, it will be appreciated this is only for convenience, and in general the approaches discussed herein are applicable for other service types and in wireless telecommunications systems which use different terminology. Thus, references herein to PUCCH should, unless the context demands otherwise, be read as referring to a physical uplink control channel generally, and not specifically to a particular format of physical uplink control channel, and so on for other channels and terminology that may be referred to herein.

HARQ-ACK (Hybrid Automatic Repeat Request acknowledgement signalling) feedback is transmitted by a communications device to a base station in respect of PDSCH scheduling to inform the base station whether the communications device has successfully decoded the corresponding PDSCH or not. Radio resources in wireless telecommunications resources comprise a grid of resources (i.e. a radio frame structure) spanning frequency and time. The frequency dimension is divided into sub-carriers and the time dimension is divided into symbols that are grouped into slots.

In some current systems, for a PDSCH ending in slot n, the corresponding PUCCH carrying the HARQ-ACK acknowledgement signalling is transmitted in slot $n+K_1$, where the value of $K_1$ is indicated in the field "PDSCH-to-HARQ_feedback timing indicator" in the downlink (DL) Grant for the PDSCH (carried by DCI (downlink control information) Format 1_0 or DCI Format 1_1). Multiple (different) PDSCHs can point to the same slot for transmission of their respective HARQ-ACKs, and multiple HARQ-ACKs in the same slot can be multiplexed into a single PUCCH. Hence a PUCCH can contain multiple HARQ-ACKs for multiple PDSCHs. An example of this is represented FIG. 4.

Figure 4:
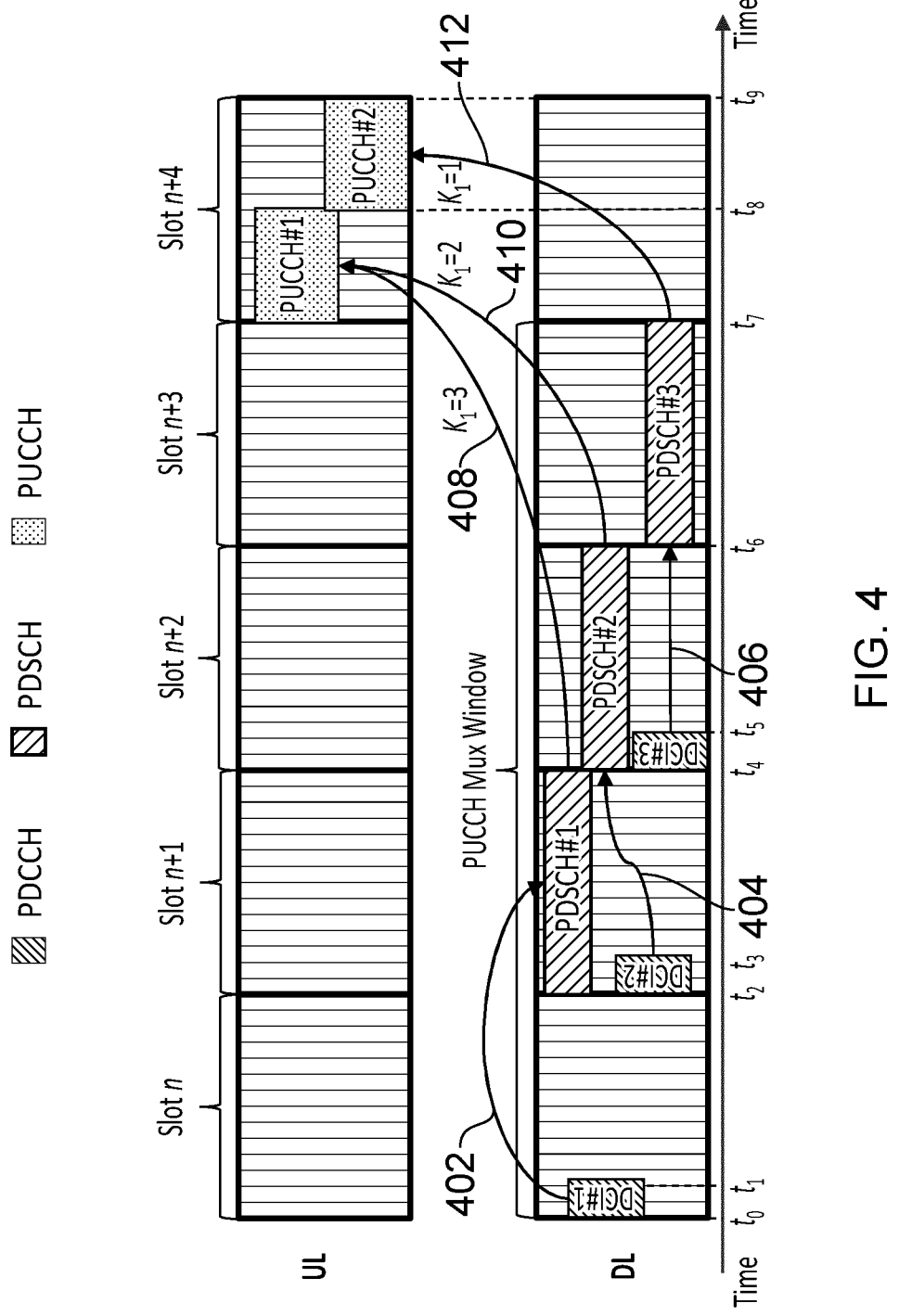
FIGS. 4 to 6 schematically show examples of radio resources associated with a communications device in an uplink grid of radio communications resources (top half of figure) and downlink grid of radio communications resources (bottom half of figure) for a communications device operating in accordance with previously proposed techniques.

FIG. 4 schematically shows an uplink radio resource grid (top half of figure) and downlink radio resource grid (bottom half of figure) representing radio resources in time (horizontal axis) and frequency (vertical axis). FIG. 4 schematically shows radio resources used by a communications device in an example scenario during a period spanning five slots (identified in FIG. 4 as slots n to n+4). In slot n the communications device receives downlink control information (DCI #1) indicating an allocation of radio resources (represented by arrow 402) on a physical downlink shared channel (PDSCH #1) in slot n+1 with a PDSCH-to-HARQ_feedback timing indicator value of $K_1=3$ and a "PUCCH Resource Indicator" (PRI) field indicating resources in the first half of the slot (i.e. PUCCH #1 in FIG. 4). In slot n+1 the communications device receives downlink control information (DCI #2) indicating an allocation of radio resources (represented by arrow 404) on a physical downlink shared channel (PDSCH #2) in slot n+2 with a PDSCH-to-HARQ_feedback timing indicator value of $K_1=2$ and a PRI field indicating the same resources in the first half of the slot as for DCI #1 (i.e. PUCCH #1). In slot n+2 the communications device receives downlink control information (DCI #3) indicating an allocation of radio resources (represented by arrow 406) on a physical downlink shared channel (PDSCH #3) in slot n+3 with a PDSCH-to-HARQ_feedback timing indicator value of $K_1=1$ and a PRI field indicating resources in the second half of the slot (i.e. PUCCH #2 in FIG. 4). Thus, in this particular example scenario, the HARQ-ACK feedbacks for each of the three downlink transmissions on the physical downlink shared channel are scheduled to be transmitted by the communications device in slot n+4 (as represented by arrows 408, 410, 410) and so can be transmitted in a multiplexed manner. To support this multiplexed HARQ-ACK function a Multiplexing Window may be defined, wherein the Multiplexing Window is a time window indicating how many PDSCHs can have their associated HARQ-ACK signalling multiplexed in PUCCH in a single slot and may depend on the range of $K_1$ values. In the example in FIG. 4, the PUCCH Multiplexing Window is assumed to be from Slot n to Slot n+3, which means the max $K_1$ value that can be used in this period is 4.

For the example represented in FIG. 4 there are two PUCCH indicated for the communications device in slot n+4 (i.e. PUCCH #1 on symbols comprising the first half of the slot and PUCCH #2 on symbols comprising the second half of the slot). For wireless telecommunications systems operating in accordance with Release 15 of the 3GPP standards, only one PUCCH per slot is allowed to carry HARQ-ACKs for the same communications device, even in the case of different indicated PUCCHs that do not overlap in time, as in FIG. 4. Thus, when a communications device operating in accordance with Release 15 of the 3GPP standards is to multiplex HARQ-ACK signalling for multiple PDSCH it does so using the PUCCH resources indicated in the PRI associated with the last PDSCH in the PUCCH Multiplexing Window (since the communications device will only know the total number of HARQ-ACK bits after last PDSCH is allocated). Thus, in the example in FIG. 4, DCI #1 and DCI #2 indicate PUCCH #1 for the HARQ-ACK signalling, but DCI #3 indicates PUCCH #2. Even though PUCCH #1 and PUCCH #2 do not overlap in time in this example, they cannot both be transmitted in the same slot according to Release 15 of the 3GPP standards. In this case, since DCI #3 schedules the last PDSCH, i.e. PDSCH #3, in the PUCCH Multiplexing Window, the communications device will use PUCCH #2 to carry the multiplexed HARQ-ACK for PDSCH #1, PDSCH #2 and PDSCH #3. (It may be noted that PUCCH carrying other UCI, such as a Scheduling Request (SR) may be transmitted separately from a PUCCH carrying HARQ-ACK in the same slot if they do not overlap in time).

For Release 16 of the 3GPP standards the possibility of sub-slot operation for HARQ-ACK acknowledgement signalling was introduced. Sub-slot operation for HARQ-ACK allows the timings of HARQ-ACK UCI on PUCCH to be configured with a resolution which is less than one slot (i.e. the HARQ-ACK process operates with sub-slot timing granularity). Sub-slot based PUCCH thus allows more than one PUCCH carrying HARQ-ACKs to be transmitted within a slot. This provides for more opportunities for PUCCH carrying HARQ-ACK in respect of PDSCH transmissions to be transmitted within a slot, thereby potentially helping to reduce the latency of HARQ-ACK feedback. In a sub-slot based PUCCH, the granularity of the $K_1$ parameter (i.e. the time difference between the end of PDSCH and the start of its corresponding PUCCH) is in units of sub-slot instead of slot, where the sub-slot size can be 2 symbols or 7 symbols. An example of sub-slot HARQ-ACK operation is shown in FIG. 5.

Figure 5:
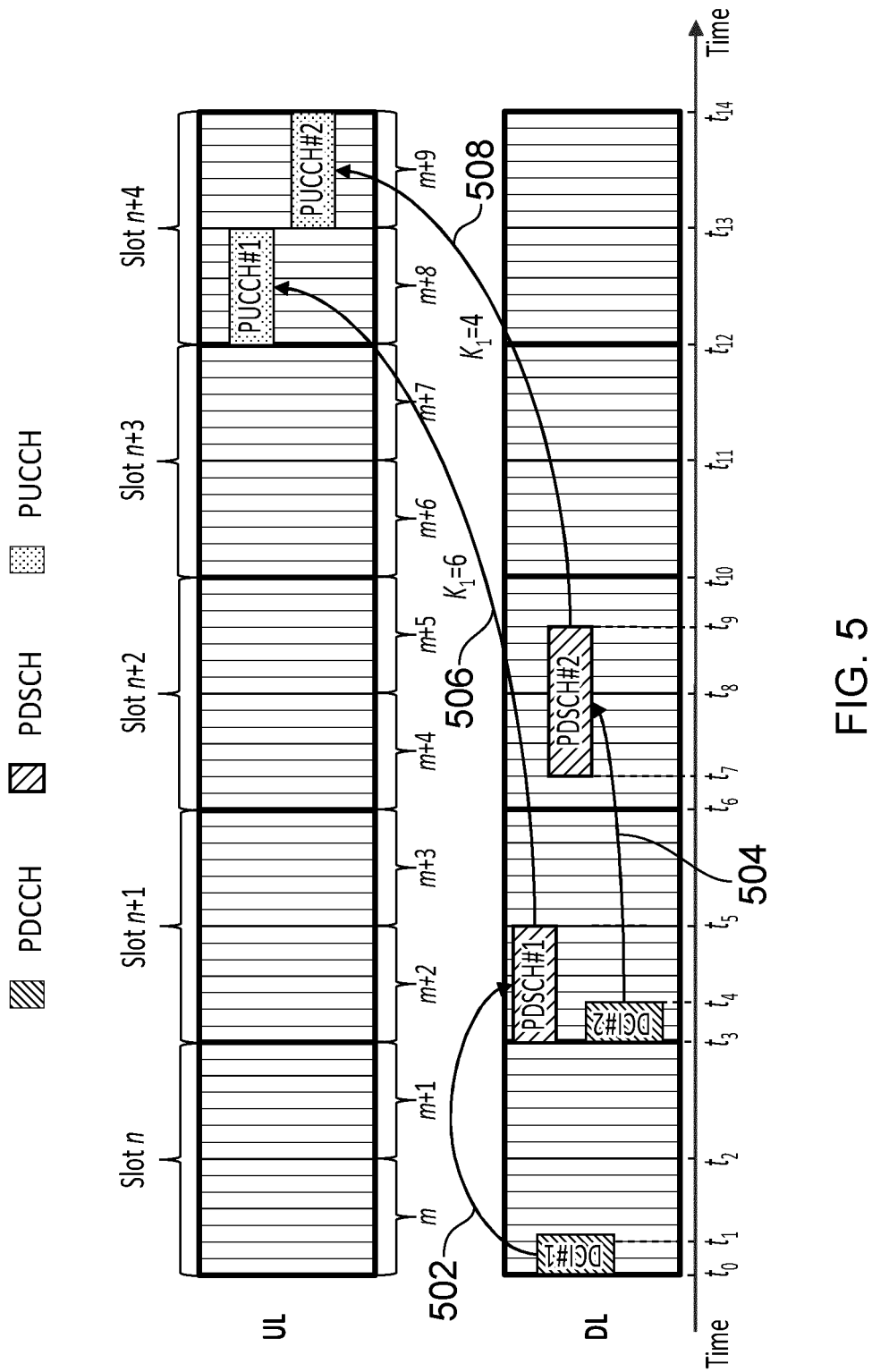

FIG. 5 is similar to, and will be understood from, FIG. 4, but this example schematically shows an uplink radio resource grid (top half of figure) and downlink radio resource grid (bottom half of figure) representing radio resources in time (horizontal axis) and frequency (vertical axis) in a scenario that support sub-slot operation for HARQ-ACK feedback with a sub-slot size of 7 symbols (i.e. half a slot in this case). Thus FIG. 5 schematically shows radio resources used by a communications device in an example scenario during a period spanning five slots (identified in FIG. 5 as slots n to n+4)/ten sub-slots (identified in FIG. 5 as sub-slots m to m+9). In sub-slot m the communications device receives downlink control information (DCI #1) indicating an allocation of radio resources (represented by arrow 502) on a physical downlink shared channel (PDSCH #1) in sub-slot m+2 with a PDSCH-to-HARQ_feedback timing indicator value of $K_1=6$. This means the communications device determines the resources PUCCH #1 to use for transmitting acknowledgement signalling in respect of PDSCH #1 (represented by arrow 506) as indicated by the PRI associated with DC #1 in sub-slot m+8 (since this is the sub-slot which is $K_1=6$ sub-slots after the sub-slot in which PDSCH #1 ends). In sub-slot m+2 the communications device receives downlink control information (DCI #2) indicating an allocation of radio resources (represented by arrow 504) on a physical downlink shared channel (PDSCH #2) that spans sub-slots m+4 and m+5 with a PDSCH-to-HARQ_feedback timing indicator value of $K_1=4$. This means the communications device determines the resources PUCCH #2 to use for transmitting acknowledgement signalling in respect of PDSCH #2 (represented by arrow 506) as indicated by the PRI associated with DCI #2 in sub-slot m+9 (since this is the sub-slot which is $K_1=4$ sub-slots after the sub-slot in which PDSCH #2 ends). In contrast to approaches according to Release 15 of the 3GPP standards specification series, where only one PUCCH carrying HARQ-ACK is allowed in a slot, in a sub-slot based operation, a communications device can transmit two PUCCH carrying HARQ-ACK (i.e. PUCCH #1 and PUCCH #2) in a slot.

Uplink L1 Priority Indicator

Certain embodiments as described in the following paragraphs may concern a different priority indicator when uplink resources are allocated to a UE for uplink transmissions. A priority indicator for uplink transmissions has been proposed for 3GPP standards, in which a different priority is allocated for uplink transmissions where these uplink transmissions collide and so one must be chosen over the other. In previous versions of 3GPP standards, such as for example Release 15, there was no provision for a different priority level at the Physical Layer and when two uplink transmissions collide, information for uplink transmissions is multiplexed and transmitted using a single channel Possible collisions of uplink resources can include a PUCCH with PUCCH and PUCCH with PUSCH. In this respect the collision occurs and can be identified at the physical layer. Release 15 provided different priority levels for the media access control layer, which included sixteen priority levels, but not the physical layer.

As explained above, a UE can be configured to provide eMBB and URLLC services contemporaneously. Since eMBB and URLLC have different latency requirements, their uplink transmissions may collide. For example, after an eMBB uplink transmission has been scheduled, an urgent URLLC packet arrives which would need to be scheduled immediately and its transmission may collide with the eMBB transmission. In order to handle such intra-UE collisions with different latency and reliability requirements, two priority levels at the physical layer have been proposed in Release-16 for Uplink transmissions, such as for example transmissions via PUCCH and PUSCH channels. In Release-16 intra-UE prioritisation is used, that is, when two UL transmissions with different Physical Layer priority levels (L1 priority) collide, the UE will drop the lower priority transmission. If both UL transmissions have the same L1 priority then the UE is configured to multiplex the transmissions according to that proposed in Release-15 procedures. The gNB indicates the L1 priority to the UE in the 1 bit "Priority indicator" DCI field, where "0" indicates Low L1 priority and "1" indicates High L1 priority and:

For PUSCH, the L1 priority is indicated in the uplink grant carried by DCI Format 0_1 and 0_2

For PUCCH carrying HARQ-ACK feedback for PDSCH, the L1 priority is indicated in the Downlink grant scheduling a PDSCH, carried by DCI Format 1_1 and 1_2

According to these examples therefore, the downlink control information (DCI) carries a priority level indicator associated with the downlink data for which resources are being granted on the downlink, and the indicator may be different for different DCI formats for the PUSCH and PUCCH.

HARQ-ACK Codebook

HARQ-ACK codebook is used to carry multiple HARQ-ACK feedbacks for PDSCH. In Release-15 there are two types of HARQ-ACK codebooks:

Type 1 HARQ-ACK codebook: Also known as semi-static HARQ-ACK codebook where the number of HARQ-ACK entries is fixed, i.e. semi-statically configured by RRC. Since the HARQ-ACK entries are fixed, there is no confusion between UE and gNB on the number of HARQ-ACK feedbacks the UE should transmit to the gNB if the UE missed a downlink grant (i.e. missed a PDSCH). However, allocated a fixed number of HARQ-ACK feedbacks can waste resources since PDSCH that are not scheduled are still being feedback as NACK.

Type 2 HARQ-ACK codebook: Also known as dynamic HARQ-ACK codebook where the number of HARQ-ACK entries is dynamic and based on the actual number of PDSCH being received. To avoid confusion on the number of HARQ-ACK feedbacks due to UE missing Downlink grants a "Downlink Assignment Index" (DAI) is used to keep track of the number of PDSCH transmitted to the UE. The DAI is included in the Downlink grant and is incremented when the gNB schedules a PDSCH to the UE using Type 2 HARQ-ACK codebook.

Since the PUCCH can have two L1 priorities, two HARQ-ACK codebooks of different priorities can be configured for a UE. This allows High L1 priority HARQ-ACKs to be multiplexed into a High L1 priority HARQ-ACK codebook and Low L1 priority HARQ-ACKs to be multiplexed into a Low L1 priority HARQ-ACK codebook.

Figure 6:
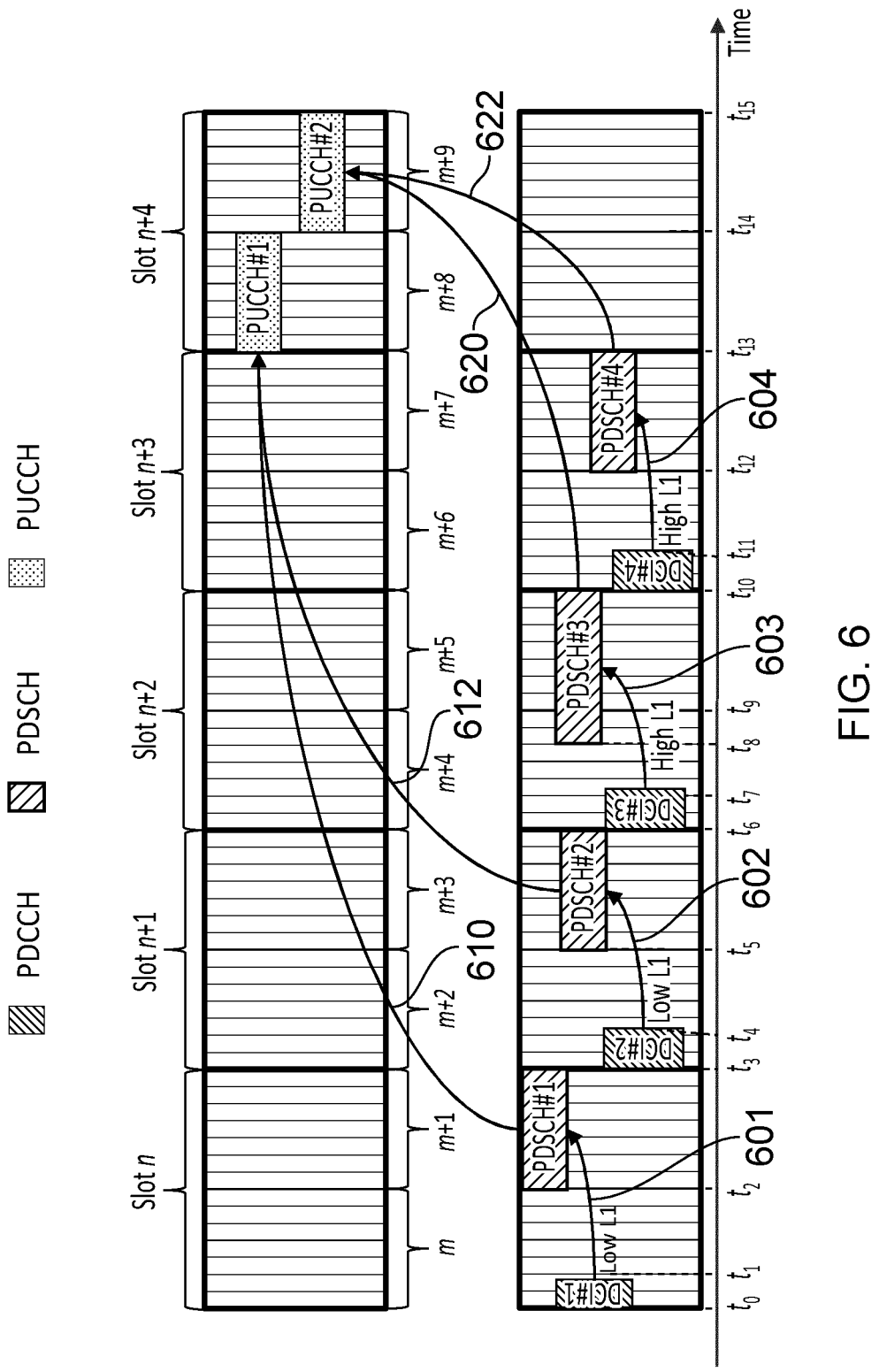

An example is shown in FIG. 6 which illustrates an arrangement in which two HARQ-ACK codebooks are provided with two different priorities. In the example shown in FIG. 6, the gNB transmits to the UE in a PDCCH (downlink control channel) a sequence of four downlink control information transmissions DCI #1, DCI #2, DCI #3, DCI #4, which respectively indicate an allocation of down-link resources PDSCH #1, PDSCH #2, PDSCH #3, PDSCH #4 respectively as represented by arrows 601, 602, 603, 604. As indicated in FIG. 6, two of the downlink control information transmissions DCI #1, DCI #2 schedule a Low L1 priority PUCCH #1 in sub-slot m+8 which carries a Low L1 priority HARQ-ACK codebook to multiplex the HARQ-ACK feedbacks for PDSCH #1 and PDSCH #2 as represented by arrows. In contrast the second two downlink control information transmissions DCI #3, DCI #4 schedule a High L1 priority PUCCH #2 in sub-slot m+9 which carries a High L1 priority HARQ-ACK codebook to multiplex the HARQ-ACK feedbacks for PDSCH #3, PDSCH #4 as represented by arrows 620, 622. Hence, according to this example, the gNB can use different PUCCH that can have different reliability to carry HARQ-ACK with different L1 priorities.

Channel Access in an Unlicensed Band

In the following paragraphs, an explanation is provided of current proposals for accessing communications from an unlicensed frequency band. In an unlicensed band, two or more systems may operate to communicate using the same communications resources. As a result, transmissions from different systems can interfere with each other especially when for example, each of the different systems are config-ured according to different technical standards, for example WiFi and 5G. As such, there is a regulatory requirement to use a Listen Before Talk (LBT) protocol for each transmitter operating in an unlicensed band to reduce interferences among different systems sharing that band. In LBT, a device that wishes to transmit a packet will firstly sense the band for any energy levels above a threshold to determine if any other device is transmitting, i.e. "listen", and if there is no detected transmission, the device will then transmit its packet. Oth-erwise, if the device senses a transmission from another device it will back-off and try again at a later time.

Figure 7:
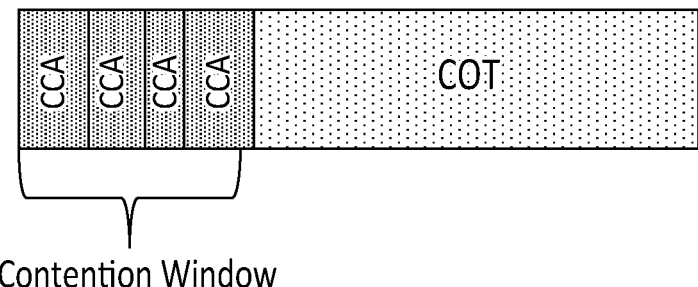
FIG. 7 schematically an example of a New Radio Unlicensed (NR-U) Channel Access on a grid of radio communications resources.

In NR-U the channel access can be Dynamic (also known as Load Based Equipment) or Semi-Static (also known as Frame Based Equipment). The dynamic channel access schemes consist of one or more Clear Channel Assessment (CCA) process in a Contention Window followed by a Channel Occupancy Time (COT) as shown FIG. 7. LBT is performed during the CCA phase by an NR-U device (e.g. gNB or UE) that wishes to perform a transmission. Accord-ing to the CCA phase the NR-U device listens to one or more of CCA slots and if no other transmission is detected (i.e. energy level below a threshold) after the CCA phase, the NR-U device moves into the COT phase where it can transmit its packet in the COT resources. In Dynamic Channel Access (DCA) the CCA and COT phases can be different length between different systems whilst in Semi-static Channel Access, the CCA and COT phases have fixed time window and are synchronized for all systems sharing the band.

In NR-U a device can be an initiating device or a responding device. The initiating Device acquires the COT by performing CCA and typically it initiates a first trans-mission, e.g. a gNB transmitting an uplink grant. The responding device receives the transmission from the initi-ating device and responses with a transmission to the initiating device, e.g. a UE receiving an uplink grant and transmits the corresponding PUSCH. As will be appreciated a UE can also be an initiating device, for example when it is transmitting a Configured Grant PUSCH and the gNB can be a responding device.

There are two types of Dynamic Channel Access (DCA), which are referred to as Type 1 and Type 2. In a Type 1 DCA, a counter N is generated as a random number between 0 and $CW_p$, where a Contention Window size $CW_p$ is set between $CW_{min,p}$ and $CW_{max,p}$. The duration of the COT and the values $\{_{min,p}, CW_{max,p}\}$ depend on the value p, which is the Channel Access Priority Class (CAPC) of the transmission, which may be determined for example by a QoS of the transmitting packet. A Type 1 DCA is performed by an initiating device and once the COT is acquired one or more responding devices can use Type 2 DCA for their transmis-sions within the COT. Type 2 DCA may require a short CCA or no CCA prior to transmission if the gap between one transmission of two devices is less than a predefined value such as for example 25 μs. If the gap is greater than this predefined value such as 25 μs then the responding device needs to perform Type 1 DCA.

Figure 8:
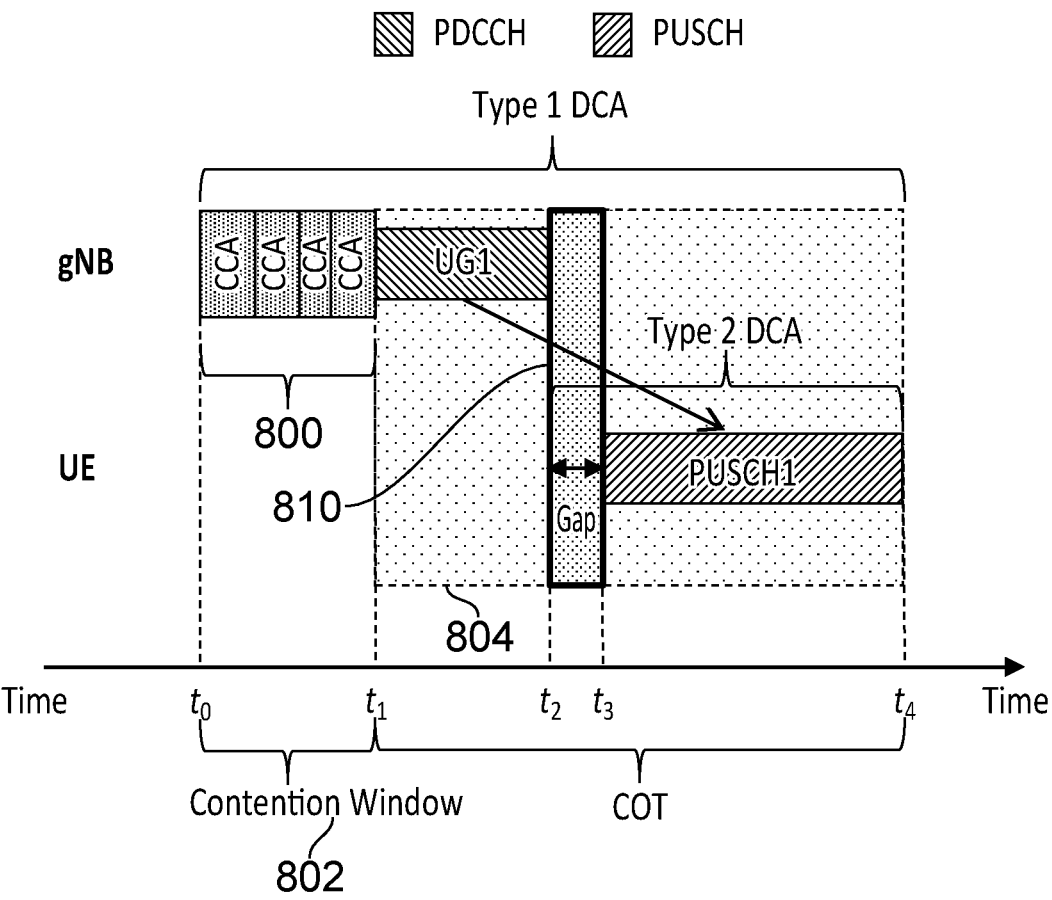
FIG. 8 schematically represents Type 1 and Type 2 Dynamic Channel Access on an uplink and downlink grid of radio communications resources.

FIG. 8 provides an illustration of frequency against time for transmission in an unlicensed band. As shown for the example of FIG. 8, an example of Type 1 DCA transmission and a Type 2 DCA is shown. According to the example shown in FIG. 8, at time $t_0$, the gNB wishes to send an uplink grant, UG1, to the UE to schedule PUSCH1. The gNB performs a Type 1 DCA starting with a Contention Window with four CCA's 800, so that for this example random number N=4, and detects no energy during this Contention Window 802 thereby acquiring the COT 804 between time $t_1$ to $t_4$. The gNB then transmits UG1 to the UE scheduling a PUSCH1 at time $t_3$ as represented by arrow 810. The UE receiving the uplink grant UG1 then can use Type 2 DCA if the gap between UG1 and the start of its PUSCH1 trans-mission, between time $t_2$ and $t_3$ is below a threshold, other-wise the UE will have to perform a Type 1 DCA. This is to say, if the granted PUSCH1 is less than a threshold time from the gNB's transmission of the uplink grant UG1, then the UE is not required to make a contention itself for the resources on the unlicensed band by transmitting in the CCA and then COT according to the Type 1 DCA.

Figure 9:
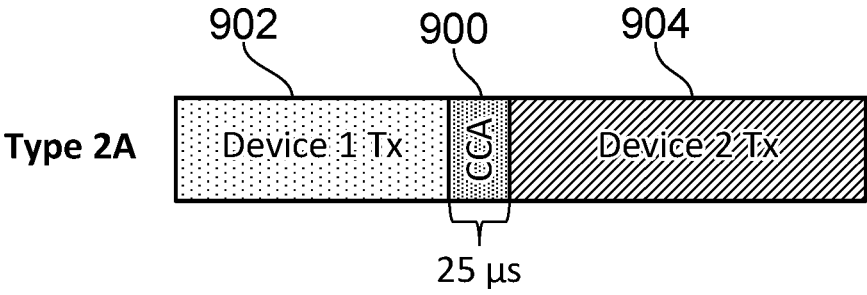
FIG. 9 illustrates examples of Type 2 Dynamic Channel Access on a grid of radio communications resources.
Figure 9:
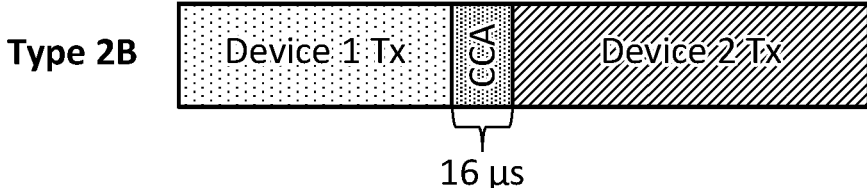
Figure 9:
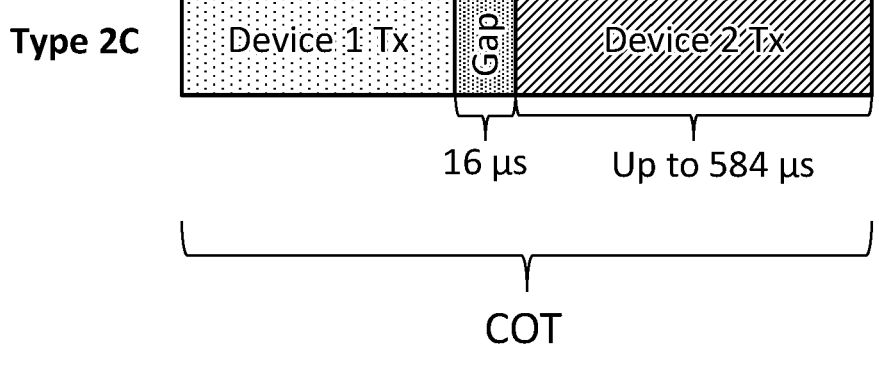

There are three types of Type 2 DCA as shown in FIG. 9, which are defined with respect to a length of the gap 900 between transmission 902 by a first device (initiating device) and a second device 904 (responding device) within a COT and therefore whether the second responding device needs to perform a CCA:

Type 2A: The gap between two transmissions is not more than 25 μs and the UE performs a single contentious channel access (CCA) within this gap 900

Type 2B: The gap between two transmissions is not more than 16 μs and the UE performs a single CCA within this gap 900

Type 2C: The gap between two transmissions is not more than 16 μs no CCA is required within this gap 900

Enhanced HARQ-ACK

In a licensed band, the gNB can schedule the PUCCH resources precisely at a specific slot/sub-slot. However, in an unlicensed band operation, due to the need for LBT (or CCA), the scheduled resources for PUCCH may not be available if the UE fails the LBT process.

Figure 10:
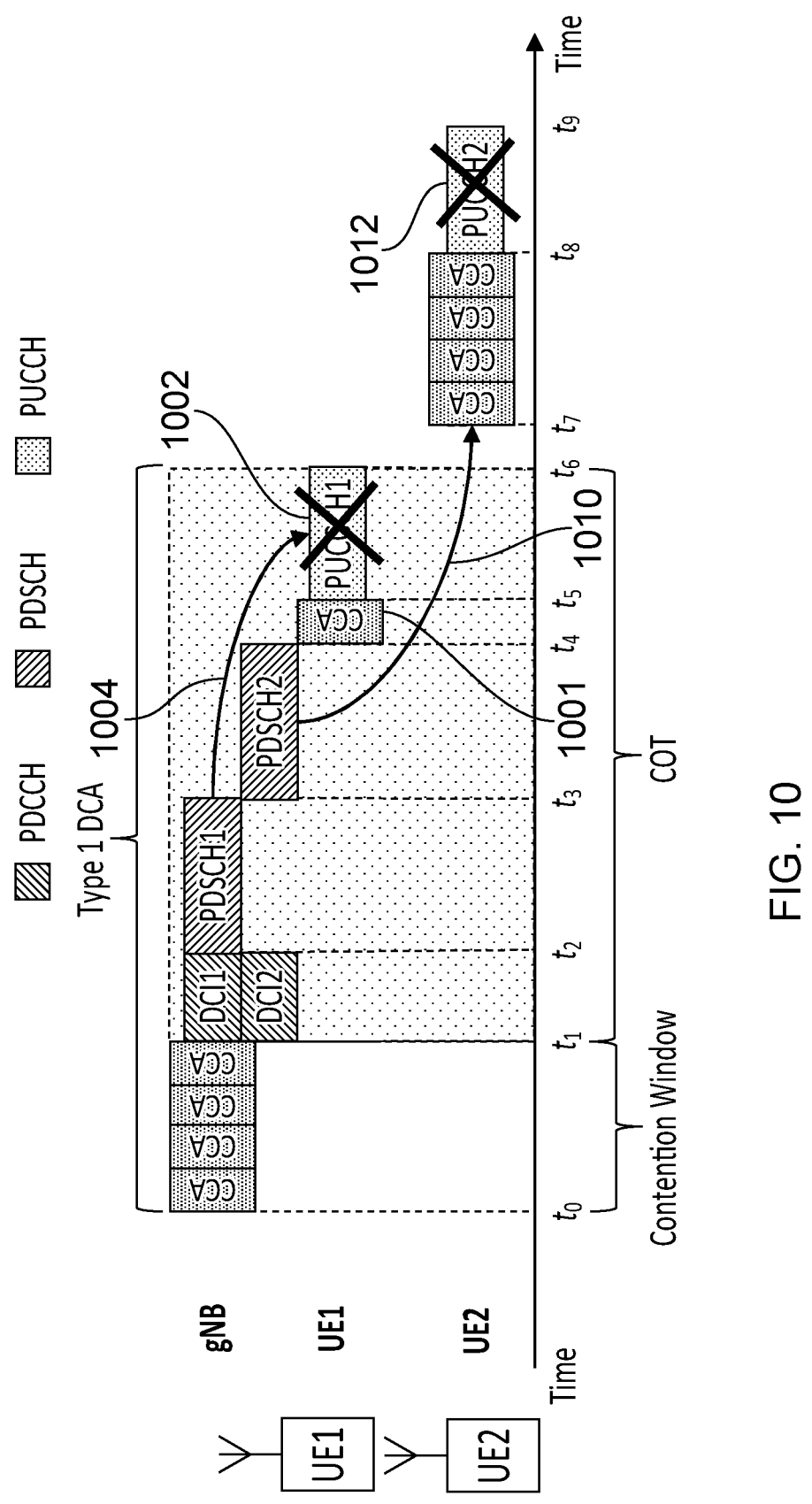
FIG. 10 illustrates examples of HARQ-ACK transmission failures on an uplink and downlink grid of radio communications resources.

An example illustration is shown in FIG. 10. In the example shown in FIG. 10, a gNB acquires a COT after performing CCA's and transmits two downlink control information transmissions DCI1, DCI2 scheduling PDSCH1 and PDSCH2 for UE1 and UE2 respectively. The corresponding HARQ-ACKs for PDSCH1 and PDSCH2 are scheduled in PUCCH1 and PUCCH2 respectively. Before transmitting PUCCH1 the UE performs Type 2 DCA but failed at a CCA process 1001 thereby unable to acquire the channel to transmit HARQ-ACK for PDSCH1 as represented by a X 1002, so that the attempt to transmit the HARQ-ACK represented by an arrow 1004 failed. PUCCH2 is scheduled outside the COT and so UE2 has to perform Type 1 DCA and here it also failed the CCA process and thereby unable to transmit the HARQ-ACK for PDSCH2, so that the attempt to transmit the HARQ-ACK represented by an arrow 1010 failed as represented by X 1012. The gNB may have to retransmit PDSCH1 and PDSCH2 which even if they are successfully received by UE1 and UE2 respectively since the corresponding HARQ-ACK feedbacks are not transmitted.

Recognising that the resource for HARQ-ACK may not be available, a Non-Numerical K1 (NN-K1) and two new HARQ-ACK codebooks (CB) have been proposed for NR-U. The K1 indicator is a known value indicating the temporal position of the uplink resources in the PUCCH after the end of the PDSCH for which a HARQ-ACK is to be transmitted. A NN-K1 indicates to the UE that no resources have yet been provided for the HARQ-ACK to be transmitted.

As described above, a time resource of a PUCCH carrying HARQ-ACK is indicated in the "PDSCH-to-HARQ_feedback timing indicator" of the downlink grant as K1 slots or sub-slots after the end of the associated PDSCH. Since the PUCCH resource in NR-U is not guaranteed, the gNB may wish to delay providing a PUCCH resource or is not confident of providing one when the downlink grant is sent. In such a case a Non-Numerical K1 (NN-K1) is indicated in the "PDSCH-to-HARQ_feedback timing indicator" of the downlink grant thereby not reserving any PUCCH resource for HARQ-ACK feedback of the PDSCH. This is beneficial for cases when the UE has an unlikely chance of acquiring the channel for the scheduled PUCCH, such as resources outside of the COT, for example PUCCH2 in FIG. 10. Effectively, NN-K1 indication allows the gNB to delay transmission of a PDSCH HARQ-ACK feedback. For Type 2 HARQ-ACK codebook operations, HARQ-ACKs associated with NN-K1 are transmitted in a next available PUCCH, i.e. PUCCH scheduled by a downlink grant where the K1 has a numerical value.

Two new HARQ-ACK codebooks may also be used, which are an enhanced Type 2 HARQ-ACK codebook (e-Type 2 CB) and a Type 3 HARQ-ACK codebook (Type 3 CB), which are introduced to provide resources for NN-K1 HARQ-ACKs and for retransmission of HARQ-ACKs due to failed LBT (contentious access in unlicensed band).

Enhanced Type 2 HARQ-ACK codebook (e-Type 2 CB) is derived from Type 2 HARQ-ACK codebook, which is a dynamic HARQ-ACK codebook. In e-Type 2 CB, two PDSCH groups are introduced where a PDSCH can be grouped into PDSCH Group 1 or PDSCH Group 2. The PDSCH Group is indicated in a new DCI field "PDSCH group index" of DCI Format 1_1 and each PDSCH Group has a separate Downlink Assignment Index (DAI) to keep track of the number of PDSCH being allocated. The gNB can indicate in another new 1 bit DCI field "Number of requested PDSCH group(s)" whether to multiplex HARQ-ACKs for PDSCH Group indicated in DCI field "PDSCH group index" or to multiplex HARQ-ACKs for both PDSCH Groups into a scheduled PUCCH. The gNB can also indicate to the UE to discard all previous HARQ-ACKs of a PDSCH Group (including those associated with NN-K1) in a new DCI field "New feedback indicator" (NFI). The NFI field is a one bit field which is toggled, so that, if the NFI is toggled, the UE discards the HARQ-ACK feedbacks associated with a PDSCH Group indicated in a DCI field "PDSCH group index" and resets the DAI counter for that PDSCH Group.

Figure 11:
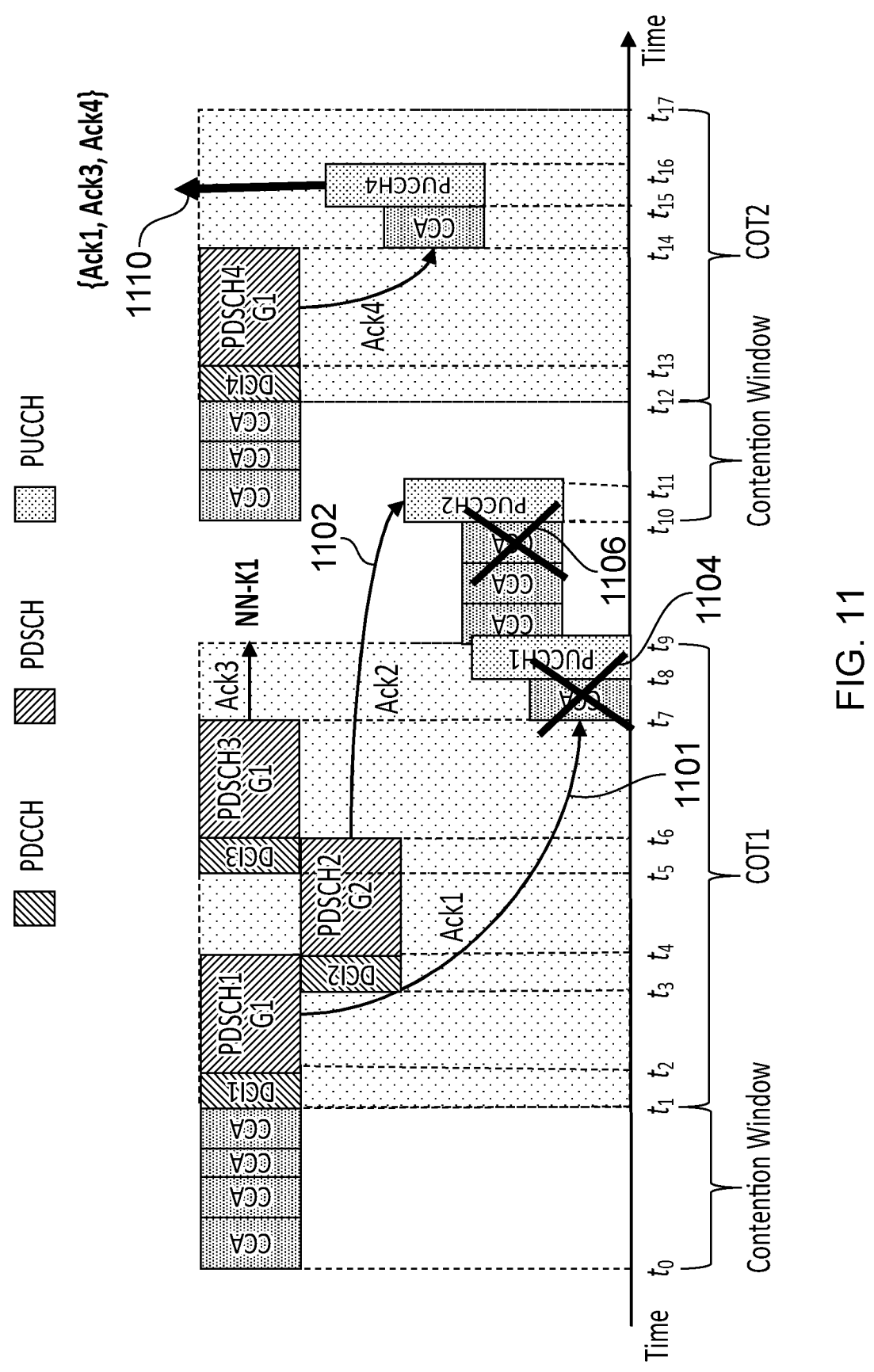
FIG. 11 illustrates example effects of using an e-type 2 Codebook introducing two PDSCH groups on an uplink and downlink grid of radio communications resources for channel access.

An example of transmissions from a gNB and a UE according to an e-Type 2 HARQ-ACK codebook is shown in FIG. 11. According to the example shown in FIG. 11, the gNB acquires a COT1 at time $t_1$ and transmits three downlink control information transmissions DCI1, DCI2, DCI3 to schedule downlink data transmissions PDSCH1, PDSCH2, PDSCH3 respectively for a UE. PDSCH1 and PDSCH3 are associated with PDSCH Group 1 whilst PDSCH2 is associated with PDSCH Group 2. Transmission of HARQ-ACKs on uplink control channels PUCCH1, PUCCH2, represented by arrows 1101, 1102, are scheduled to carry HARQ-ACK for PDSCH1 and PDSCH2 respectively. However as a result of contentious access in the unlicensed band the UE fails to acquire a channel for these PUCCH's as represented by Xs 1104, 1106. The gNB indicates NN-K1 for PDSCH3, which means that the corresponding HARQ-ACK is not allocated a PUCCH resource. At time $t_{12}$, the gNB acquires COT2 and transmits DCI4 to schedule PDSCH4 which is indicated as PDSCH Group 1 and the HARQ-ACK is scheduled to be carried by PUCCH4. The "Number of requested PDSCH group(s)" field in DCI4 is set to 1, and so only previous HARQ-ACKs belonging to PDSCH Group 1 are multiplexed into PUCCH4. At time $t_{15}$, the UE successfully acquires the channel and transmits PUCCH4 which includes HARQ-ACKs for PDSCH1, PDSCH3 and PDSCH4 as represented by an arrow 1110.

Type 3 HARQ-ACK codebook introduces a new 1 bit DCI field "One-shot HARQ-ACK request" (1-shot) in DCI Format 1_1, which indicates to the UE to transmit PDSCH HARQ-ACK feedbacks for all configured HARQ processes regardless whether the HARQ-ACK has been transmitted previously, failed due to LBT or not transmitted due to NN-K1 indication.

Figure 12:
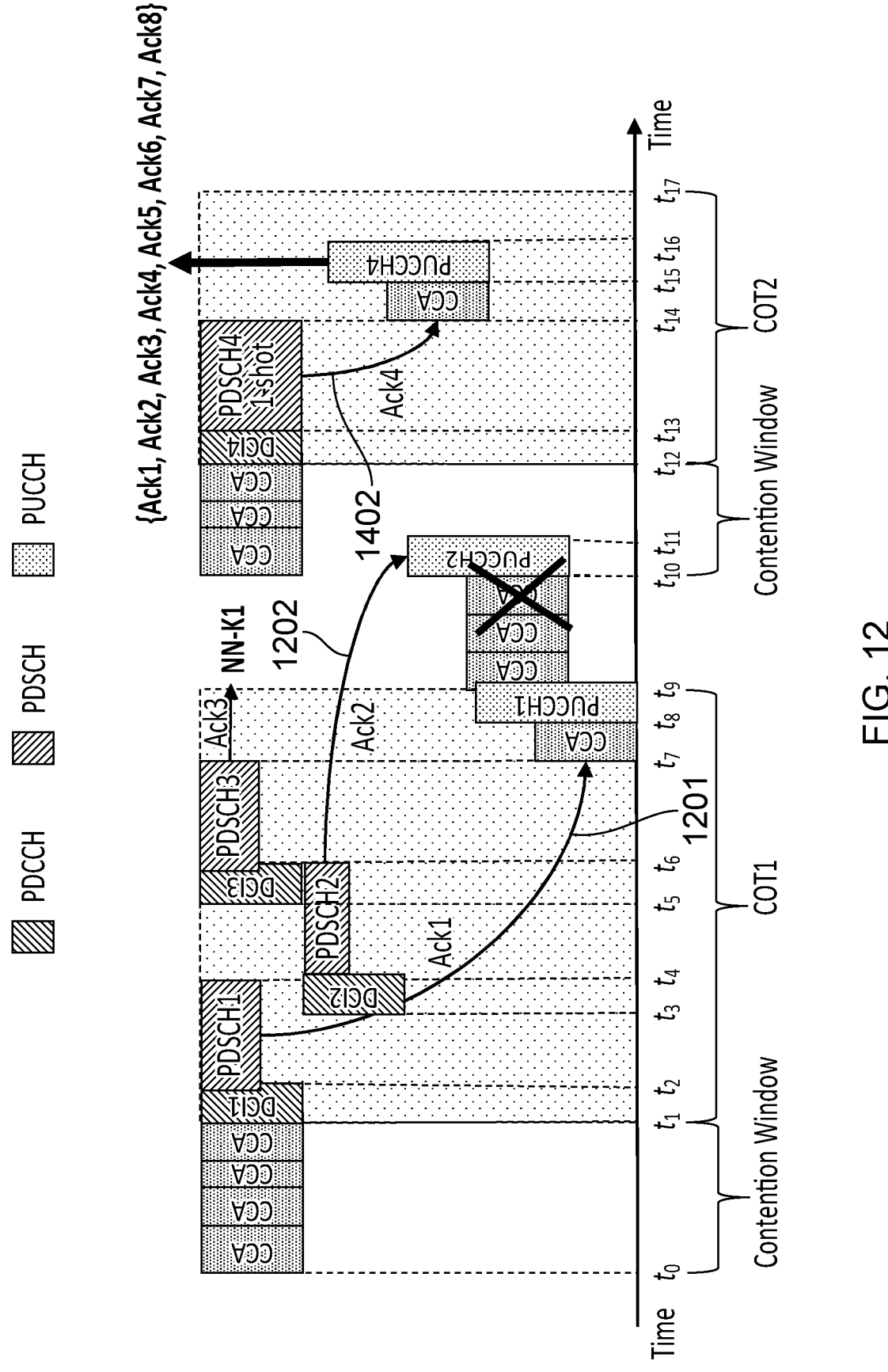
FIG. 12 illustrates example effects of using a type 3 Codebook on an uplink and downlink grid of radio communications resources for channel access.

An example of the application of the 1-shot HARQ-ACK is shown in FIG. 12. According to the example shown in FIG. 12 a UE is configured with eight HARQ processes for downlink transmission via shared resources of the PDSCH. According to this example a gNB acquires a COT1 at time $t_1$ and transmits down link control information DCI1, DCI2, DCI3 to schedule transmission of data on three corresponding downlink physical channels PDSCH1, PDSCH2, PDSCH3 respectively. The HARQ-ACK for data transmitted on PDSCH1, PDSCH2 are scheduled in resources of an uplink control channel PUCCH1, PUCCH2 respectively as represented by arrows 1201, 1202. However the DCI3 indicates NN-K1 for PDSCH3, which means that there is no specific uplink resources allocated for the transmission of the HARQ-ACK. The UE successfully transmitted PUCCH1 but failed LBT and contentious access and therefore did not transmit PUCCH2. At time $t_{12}$, the gNB acquires COT2 and transmits a DCI4 to schedule a PDSCH4 with corresponding HARQ-ACK scheduled in a PUCCH4 for the Ack4 as represented by an arrow 1204. The DCI4 also sets a 1-shot to true and so the UE transmits HARQ-ACK for all eight HARQ processes, Ack1, Ack2, Ack3, Ack4, Ack5, Ack6, Ack7, Ack8, including those it had successfully transmitted (Ack1) such as that for PDSCH1 and those it did not transmit such as for PDSCH2 and PDSCH3. For this example, the UE also transmits PDSCH HARQ-ACK for other HARQ processes not shown in FIG. 12.

Example embodiments address a relationship between HARQ-ACK codebooks and a priority with which downlink data is transmitted. For example, e-Type 2 and Type 3 HARQ-ACK codebooks (CBs), and NN-K1, have been introduced in NR-U assuming that an L1 priority indicator, which was introduced for eURLLC) is not configured. Furthermore, e-Type 2 and Type 3 CBs are supported only in DCI Format 1_1. There have been proposals to support NN-K1, e-Type 2 CB and Type 3 CB with L1 priority in DCI Format 1_1 and DCI Format 12.

For example, some proposals for supporting NN-K1 for DCI Format 1_2 [9], suggest that if a first DCI indicates NN-K1, then a second later DCI that schedules a PUCCH with a valid K1 value should:

For Type 2 codebook: The PUCCH scheduled by the second DCI must have the same L1 priority as that of the first DCI.

For e-Type 2 codebook: The second DCI's PUCCH L1 priority and PDSCH Group must match those of the second DCI.

For Type 3 codebook: All HARQ-ACKs are transmitted regardless of L1 priority.

However, none of the above proposals consider the low latency requirements of URLLC. For example, there may not be data to be scheduled in the second DCI that has the same priority as the first DCI and so delay is incurred in providing the HARQ-ACK. Furthermore, there may not be a PDSCH to transmit after the first DCI and so no PUCCH is scheduled and the UE has to wait for the next downlink grant which increases latency.

Example embodiments can provide in one example a UE operating a method of receiving data from a wireless communications network. The method comprises receiving a DCI indicating an allocation of downlink communications resources of a wireless access interface provided by the wireless communications network for receiving downlink data on a PDSCH, the DCI also providing an indication of a relative priority associated with the received downlink data is communicated on the PDSCH, and receiving the downlink data from the allocated PDSCH. According to a HARQ process, the UE then determines whether the downlink data (PDSCH) was successfully received, and generating an HARQ-ACK in accordance with whether or not the downlink data was successfully received. The UE then performs the steps of determining that uplink communications resources for transmitting the HARQ-ACK are not available, using transmission rules to identify next available uplink communications resources presenting an opportunity for transmitting the HARQ-ACK, and using the indication of the relative priority associated with the received downlink data to determine whether the UE can transmit the HARQ-ACK in the next available uplink communications resources as the resource opportunity to transmit the HARQ-ACK.

Example embodiments can provide different transmission rules for missed HARQ-ACK (for PDSCH) with different priorities. A missed HARQ-ACK is a HARQ-ACK feedback for a PDSCH that a UE is aware that it has not transmitted, for example, due to NN-K1 indication, LBT failure or collision with a high priority UL transmission.

High L1 Priority HARQ-ACK

In some embodiments, missed High L1 priority HARQ-ACKs are transmitted in a next resource opportunity regardless of a priority associated with that opportunity. In other words, a missed High L1 priority HARQ-ACK has low latency requirement and is therefore transmitted with the next available resource regardless of the priority of the next available resource. In some embodiments, more than one missed High L1 priority HARQ-ACKs may be transmitted in the next available resource.

The term resource opportunity is intended to mean an available resource which can be used for transmitting an HARQ-ACK when one was not available before according to predetermined transmission rules applied by the UE. The opportunity represents an application of the predetermined transmission rules to use resource which was not previously intended to use that resource for transmitting the HARQ-ACK.

In some embodiments, the next available resource is a PUCCH scheduled by a downlink grant. The PUCCH may have a low or a high L1 priority. The missed High L1 priority HARQ-ACKs are multiplexed into the PUCCH scheduled by the downlink grant.

In some embodiments, Low L1 priority HARQ-ACKs are multiplexed together with the missed High L1 priority HARQ-ACKs in the PUCCH scheduled by the downlink grant. In other words, all of the HARQ-ACKs are transmitted by the PUSCH scheduled by the downlink grant.

In some embodiments, the missed High L1 priority HARQ-ACK overwrites Low L1 priority HARQ-ACKs. In other words, the Low L1 priority HARQ-ACKs are dropped.

In some embodiments, if the PUCCH scheduled by the downlink grant has a Low L1 priority, the missed High L1 priority HARQ-ACK replaces some of the Low L1 priority HARQ-ACKs. In other words, some of the Low L1 priority HARQ-ACKs are dropped In some embodiments, if the PUCCH has Low L1 priority, the HARQ-ACKs only if there are not sufficient spaces for all the missed High L1 priority HARQ-ACKs.

In some embodiments, the next available resource is a PUSCH transmission, which is scheduled by an uplink grant. In such embodiments, the missed High L1 priority HARQ-ACKs are multiplexed into the PUSCH transmission. In such embodiments, the missed High L1 priority HARQ-ACKs may be multiplexed into the PUSCH transmission using a UCI to PUSCH multiplexing method [10] for example.

In some embodiments, the next available resource is a Configured Grant (CG) PUSCH.

A CG is uplink resources that are RRC configured for a UE such that the UE can use the resources without requiring a DCI carrying an uplink grant. CG is useful for periodic traffic and low latency traffic.

In some embodiments, the next available resource is a PUSCH without data or with dummy data. The PUSCH without data or with dummy data can be scheduled by CG or dynamically by an uplink grant. The UE may multiplex the missed High L1 priority HARQ-ACK into the PUSCH without data or with dummy data. Such embodiments are particularly advantageous if the UE does not have uplink data to transmit and therefore allows a gNB or UE to transmit the HARQ-ACK without data.

Figure 13:
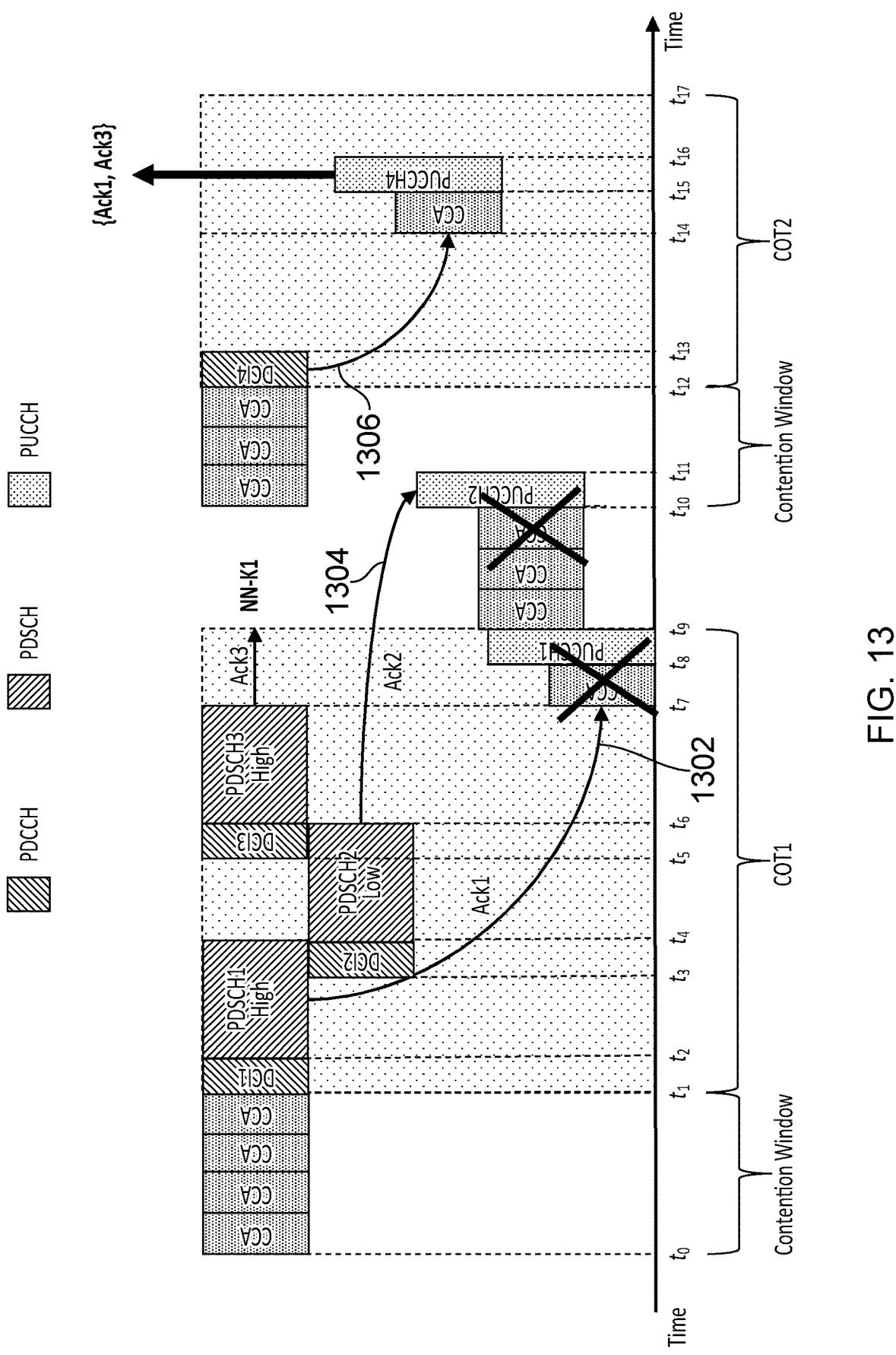
FIG. 13 illustrates examples of a PUCCH only grant for transmitting missed HARQ-ACK transmissions on an uplink and downlink grid of radio communications resources in accordance with exemplary embodiments.

In some embodiments, a gNB schedules a PUCCH only resource using a DCI as shown in FIG. 13. The DCI may be a downlink grant without any PDSCH resource or a new type of grant. Here the K1 value will be relative to the end of the PDCCH carrying this Grant rather than the end of PDSCH. Such embodiments are particularly advantageous if there is no downlink data for the UE, since such embodiments allow the gNB to schedule a PUCCH for missed High L1 priority HARQ-ACKs.

In FIG. 13, a gNB acquires COT1 and transmits DCI1, DCI2, DCI3 to schedule PDSCH1, PDSCH2, PDSCH3 respectively. The HARQ-ACKs corresponding to PDSCH1, PDSCH3 are associated with High L1 priority PUCCH whilst that for PDSCH2 is associated with Low L1 priority PUCCH. The HARQ-ACK for data to be transmitted on PDSCH1, PDSCH2 are scheduled in resources of an uplink control channel PUCCH1, PUCCH2 respectively as represented by arrows 1302, 1304.

The UE fails LBT for PUCCH1, PUCCH2 which are associated with PDSCH1, PDSCH2 respectively and DCI3 indicates NN-K1. As a result the UE did not transmit any HARQ-ACK which corresponded to the downlink data transmissions on the PDSCH1, PDSCH2. The gNB acquires COT2 and sends DCI4 which is a PUCCH only grant scheduling PUCCH4 as represented by arrow 1306. The UE multiplexes HARQ-ACK for missed High L1 priority PDSCH (in other words, HARQ-ACK for PDSCH1, PDSCH3) into PUCCH4 thereby transmitting them to the gNB.

Figure 14:
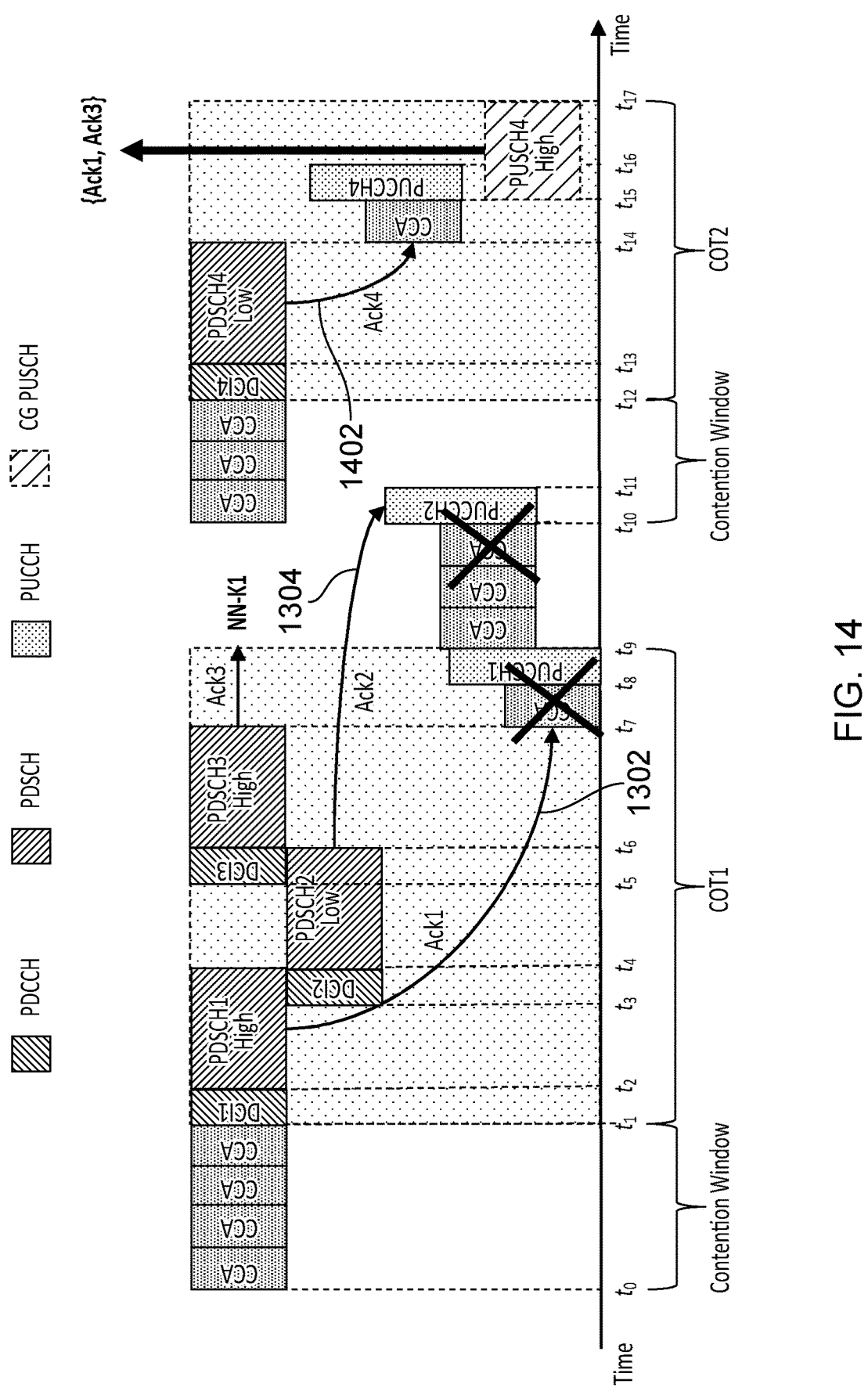
FIG. 14 illustrates examples of a UE selecting an earliest resource opportunity that is associated with high L1 priority for transmitting missed HARQ-ACK transmissions on an uplink and downlink grid of radio communications resources in accordance with exemplary embodiments.

In some embodiments, if there is an opportunity for more resource, then the UE selects the resource opportunity that is associated with High L1 priority as shown in FIG. 14. Currently, a collision between uplink transmission such as PUSCH or PUCCH can occur and therefore it is possible that the UE is provided with an opportunity for more than one resource. A High L1 priority resource is expected to have higher reliability than one with Low L1 priority. Embodiments can therefore provide the UE with a reliable resource for its missed High L1 priority HARQ-ACKs by selecting the resources which become available.

In FIG. 14, the gNB schedules PDSCH1, PDSCH2 and PDSCH3 in COT1 similar to the example in FIG. 13. However, in COT2 in FIG. 14, the UE is scheduled a PDSCH4 with a corresponding Low L1 priority PUCCH4 as represented by arrow 1402. The UE is also configured with CG PUSCH which has High L1 priority. In such embodiments, the UE multiplexes the missed High L1 priority HARQ-ACKs into PUSCH4. In some embodiments, if a PUSCH without data or with dummy data can be transmitted then the UE may use the CG to transmit a PUSCH containing only the HARQ-ACK bits.

Figure 15:
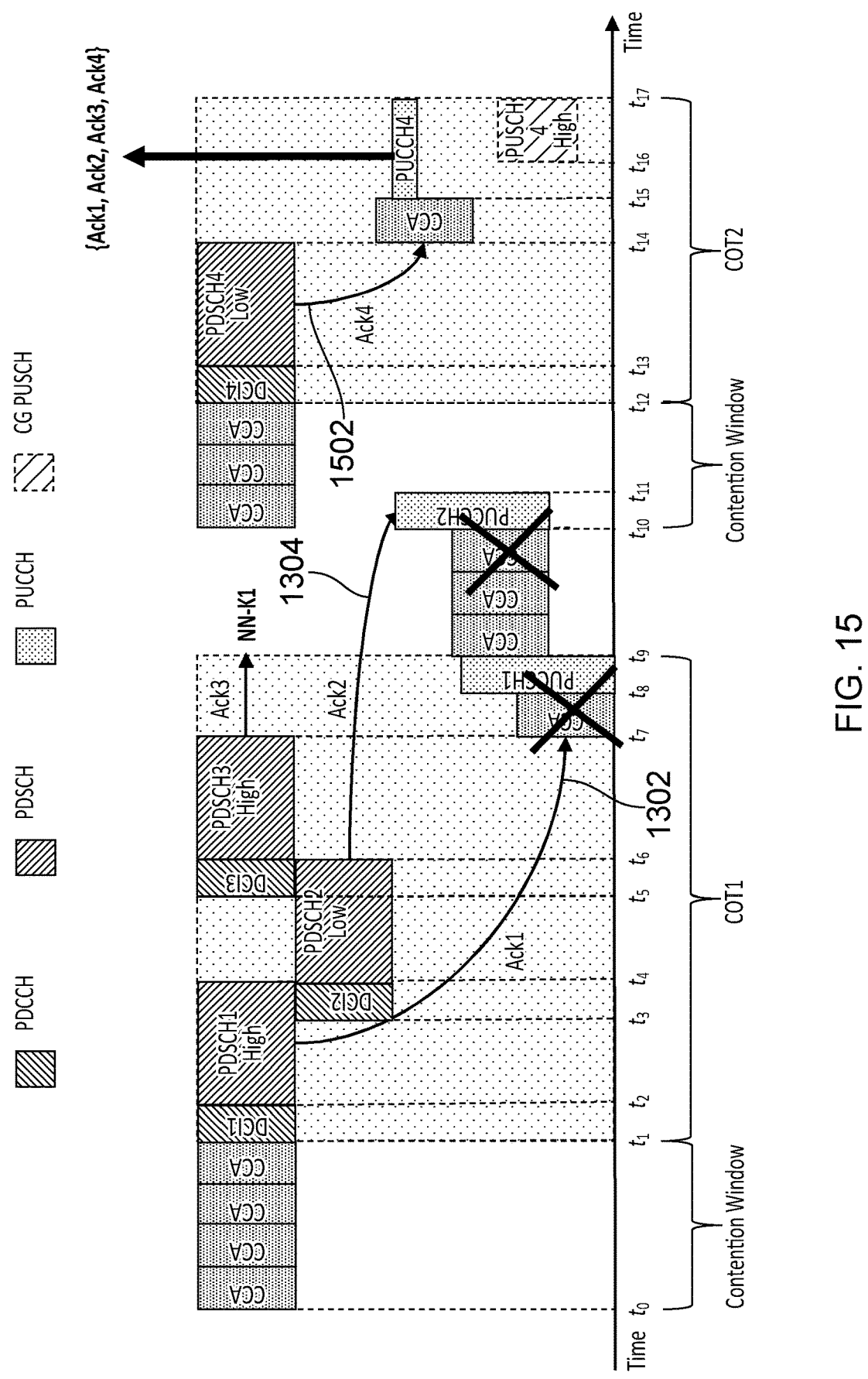
FIG. 15 illustrates examples of a UE selecting an earliest resource opportunity regardless of the L1 priority of the resource for transmitting missed HARQ-ACK transmissions on an uplink and downlink grid of radio communications resources in accordance with exemplary embodiments.

In some embodiments, if there is more than one resource opportunity, the UE selects the earliest resource opportunity. The UE may use a resource, which has been allocated a resource for a HARQ-ACK transmission for a Low L1 priority PDSCH transmission if it comes earlier than a resource for a HARQ-ACK transmission for a High L1 priority transmission as shown in FIG. 15. Such embodiments are particularly advantageous if latency requirements are very stringent. In FIG. 15, the gNB schedules PDSCH1, PDSCH2 and PDSCH3 in COT1 similar to the example in FIGS. 13 and 14. In COT2 in FIG. 15, the gNB schedules PDSCH4 with a corresponding Low L1 priority PUCCH4 as represented by arrow 1402. As will be appreciated from FIG. 15, the PUCCH4 collides with a configured grant PUSCH4. In this example there is no uplink data to transmit and so the UE selects the earliest resource as the opportunity provides (resource opportunity), which is the PUCCH4 to transmit the HARQ-ACKs Ack1, Ack2, Ack3, Ack4, despite it having a lower L1 priority than PUSCH4. In some embodiments, if UE has uplink data and uses PUSCH4, then the UE will transmit PUSCH4 and will drop the transmission in the PUCCH4, because this cannot be done at the same time. In some embodiments, if mixed priority UCI multiplexing is introduced, the UE will multiplex UCI from PUCCH4 providing the HARQ-ACKs Ack1, Ack2, Ack3, Ack4 into PUSCH4.

Figure 16:
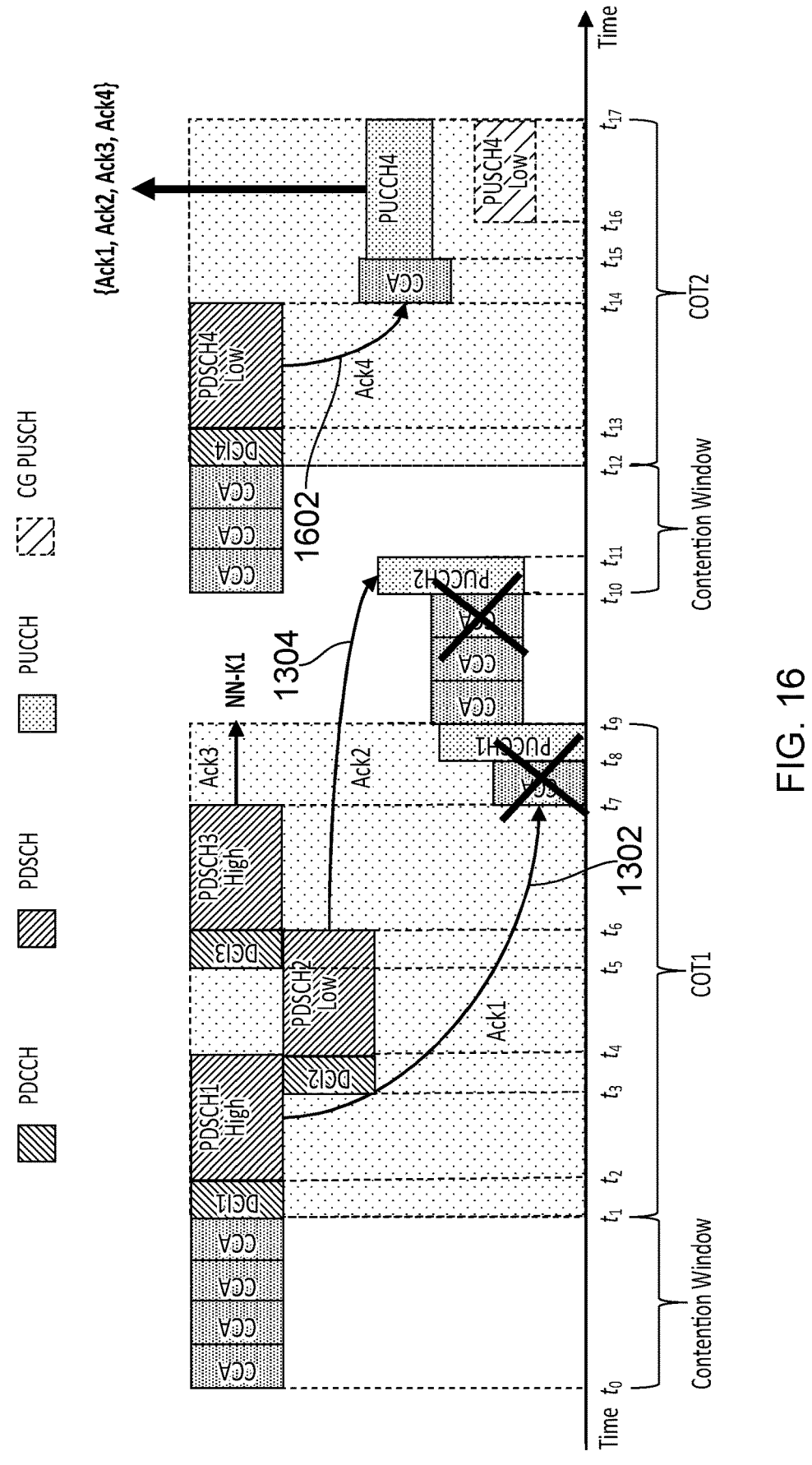
FIG. 16 illustrates examples of a UE selecting an earliest resource opportunity from two resource opportunities with the same L1 priority for transmitting missed HARQ-ACK transmissions on an uplink and downlink grid of radio communications resources in accordance with exemplary embodiments.

In some embodiments, if there is more than one resource opportunity with the same L1 priority (Low or High), the UE selects the earliest resource opportunity. An example is shown in FIG. 16, where the gNB schedules PDSCH1, PDSCH2 and PDSCH3 in COT1 similar to the examples in FIGS. 13, 14 and 15. In COT2 in FIG. 16, a DCI4 schedules a UE with a PDSCH4 that has a corresponding Low L1 priority PUCCH4 which collides with a Low L1 priority configured grant of uplink resources PUSCH4 as represented by arrow 1602. In this example the UE does not have uplink data to transmit and so does not need the uplink resources PUSCH4. Since PUCCH4 and PUSCH4 have a Low L1 priority the UE selects PUCCH4 which arrives earlier than PUSCH4 for the missed High L1 priority HARQ-ACK Ack1, Ack2, Ack3 transmissions. In such embodiments, the High L1 priority HARQ-ACKs Ack1, Ack3 are multiplexed with Low L1 priority HARQ-ACKs Ack2, Ack4 and so the PUCCH4 carries all the missed HARQ-ACKs Ack1, Ack2 and Ack3 (from COT1) and also Ack4 i.e the HARQ-ACK for PDSCH4.

Figure 17:
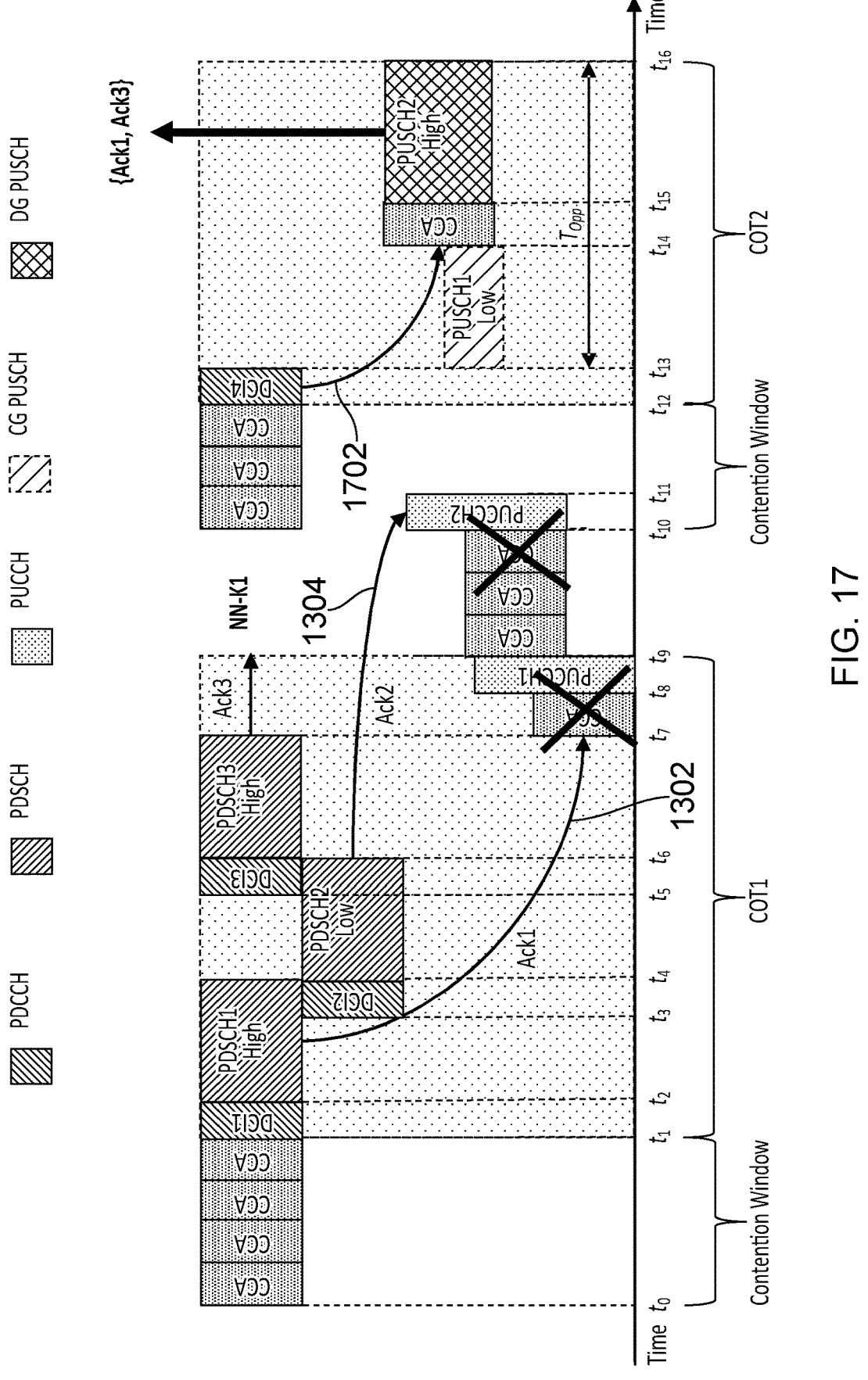
FIG. 17 illustrates examples candidate resource opportunities in an Opportunity Time Window for transmitting missed HARQ-ACK transmissions on an uplink and downlink grid of radio communications resources in accordance with exemplary embodiments.

In some embodiments, an Opportunity Time Window $T_{Opp}$ is defined such that resource opportunities within this time window are candidates for transmission of missed High L1 priority HARQ-ACK even when they do not collide. An example is shown in FIG. 17. In FIG. 17 a gNB schedules PDSCH1, PDSCH2 and PDSCH3 in COT1 similar to the examples in FIGS. 13, 14, 15 and 16. In COT2 in FIG. 17, an Opportunity Time Window $T_{Opp}$ is defined after the start of DCI4 between time $t_{13}$ and $t_{16}$. Within $T_{Opp}$, candidate resource opportunities are an uplink configured grant PUSCH1 and an uplink dynamic grant PUSCH2, which is scheduled by a DCI4 providing the uplink grant. In some embodiments, the UE uses the resource with High L1 priority (PUSCH 2 in FIG. 17) to transmit the missed High L1 priority HARQ-ACKs Ack1, Ack3.

In some embodiments, the Opportunity Time Window $T_{Opp}$ is the duration of the COT. In other words, $T_{Opp}$ starts at the beginning of the COT and ends when the COT ends. Referring to the example in FIG. 17, $T_{Opp}$ starts at time $t_{12}$ and ends at time $t_{16}$, i.e., the duration of COT2.

In some embodiments, an earliest resource opportunity for a UE with a missed High L1 priority HARQ-ACK will always be associated with a High L1 priority. In other words, the gNB will ensure that the UE receives a High L1 priority resource to transmit its missed High L1 priority HARQ-ACK. The UE will not expect the first resource opportunity to be associated with a Low L1 priority. Such embodiments are particularly advantageous because the gNB is aware which HARQ-ACKs were not transmitted by the UE and so will ensure that High L1 priority HARQ-ACKs are transmitted before Low L1 priority HARQ-ACKs. In example embodiments, the UE may transmit one or more high L1 priority HARQ-ACKs in the high L1 priority resource provided by the gNB. In such example embodiments, the UE may not transmit low L1 priority HARQ-ACKs in the high L1 priority resource provided by the gNB.

Figure 18:
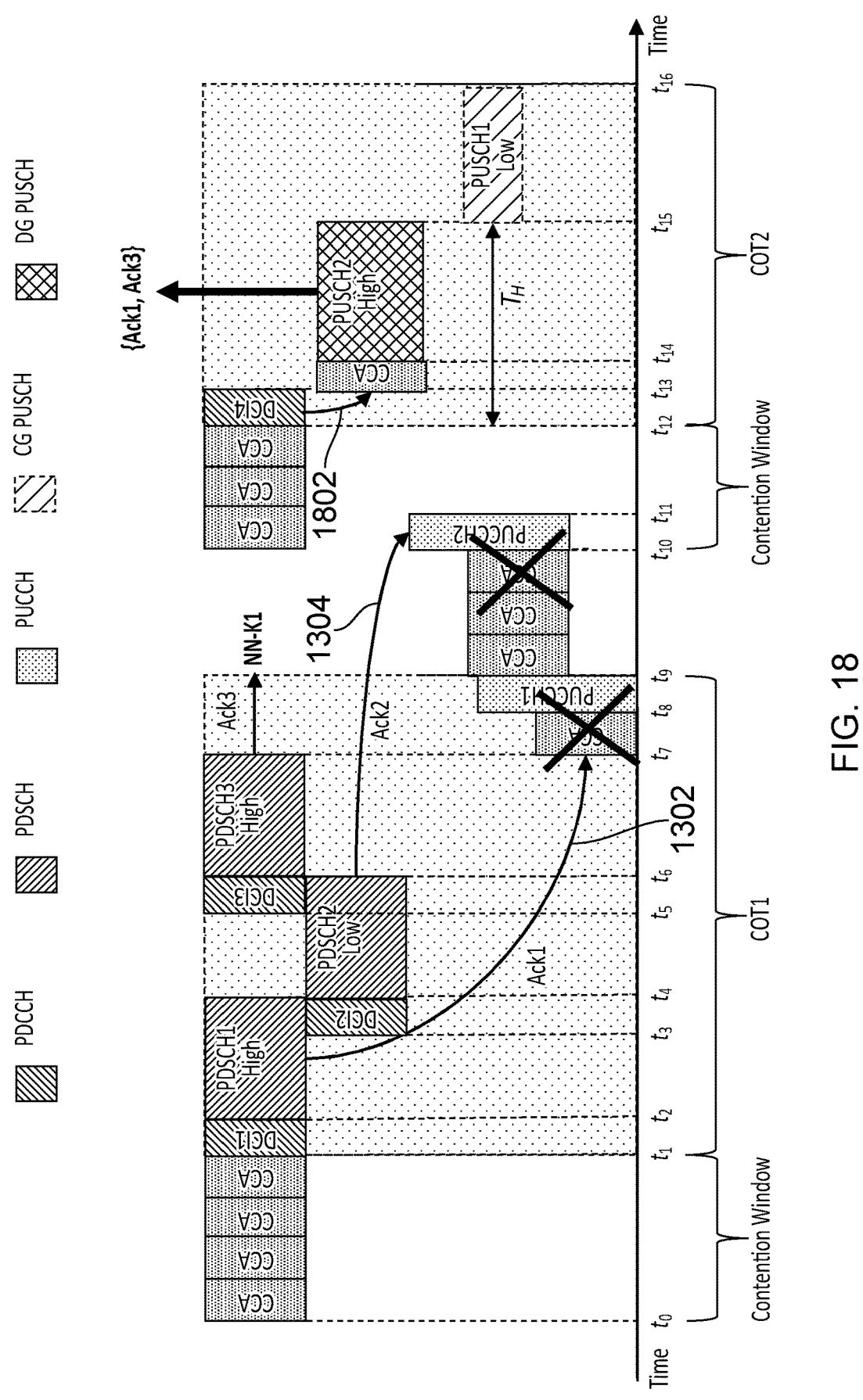
FIG. 18 illustrates examples of a base station or gNB ensuring that high L1 priority resources are available to the UE for transmitting missed HARQ-ACK transmissions on an uplink and downlink grid of radio communications resources in accordance with exemplary embodiments.

In some embodiments, the gNB ensures there is at least one High L1 priority resource for the UE within a time $T_H$ from the start of a COT if the UE has missed High L1 priority HARQ-ACKs as shown in FIG. 18. In FIG. 18 the gNB schedules PDSCH1, PDSCH2 and PDSCH3 in COT1 similar to the examples in FIGS. 13, 14, 15, 16 and 17. In COT2 in FIG. 18, the gNB schedules a High L1 priority PUSCH2 within time $T_H$ as represented by arrow 1802 to ensure that the UE can transmit its missed High L1 priority HARQ-ACKs. In such embodiments, the gNB may perform Type 2C DCA as explained above before allocating the unlicensed PUSCH2 resources to the UE for transmission of the missed high priority HARQ-ACKs.

In some embodiments, $T_H$ starts at the end of the previous COT where the UE has a missed High L1 priority HARQ-ACK. Referring to the example in FIG. 15, $T_H$ starts at time $t_9$ and ends at time $t_{15}$.

In some embodiments, time duration of $T_{Opp}$ and $T_H$ are RRC configured, and fixed in the specifications or indicated in DCI. In such embodiments, the gNB acquires a COT before the DCI is transmitted.

PDSCH Group

In some embodiments, in which an e-Type 2 codebook is used, a PDSCH Group may be configured.

In such embodiments, missed High L1 priority HARQ-ACKs may be multiplexed into a resource opportunity. For example a resource opportunity may be a PUCCH, if the HARQ-ACK and the resource opportunity are associated with the same PDSCH Group regardless of L1 priority. This allows the gNB to manage the PUCCH resource between different PDSCH Groups.

In such embodiments, missed High L1 priority HARQ-ACKs may be multiplexed into a resource opportunity, for example a PUCCH, regardless of PDSCH Group and L1 priority. Such embodiments reduce latency by allowing UE to be multiplexed into PUCCH associated with any PDSCH Group. If the resource opportunity, for example PUCCH, is of Low L1 priority and the gNB desires that all PDSCH groups to be multiplexed regardless of priority (i.e. High & Low L1 priority HARQ-ACKs) then it can indicate "Number of requested PDSCH group(s)"=2.

In such embodiments, the UE can be configured to either multiplex only missed High L1 priority HARQ-ACKs if they match the PDSCH Group or HARQ-ACKs for transmissions in one or more PDSCHs from other Groups.

Low L1 Priority HARQ-ACK

In some embodiments, missed Low L1 priority HARQ-ACK are only multiplexed into a resource opportunity that is Low L1 priority.

In some embodiments, the gNB indicates whether a missed Low L1 priority HARQ-ACK can be multiplexed into resource opportunity that is High L1 priority. This indicator can be indicated in the DCI or configured by RRC.

Therefore embodiments of the disclosure can allow missed High L1 priority HARQ-ACKs to be transmitted with low latency regardless of whether the next available resources are of the same PDSCH Group and L1 priority.

Figure 19:
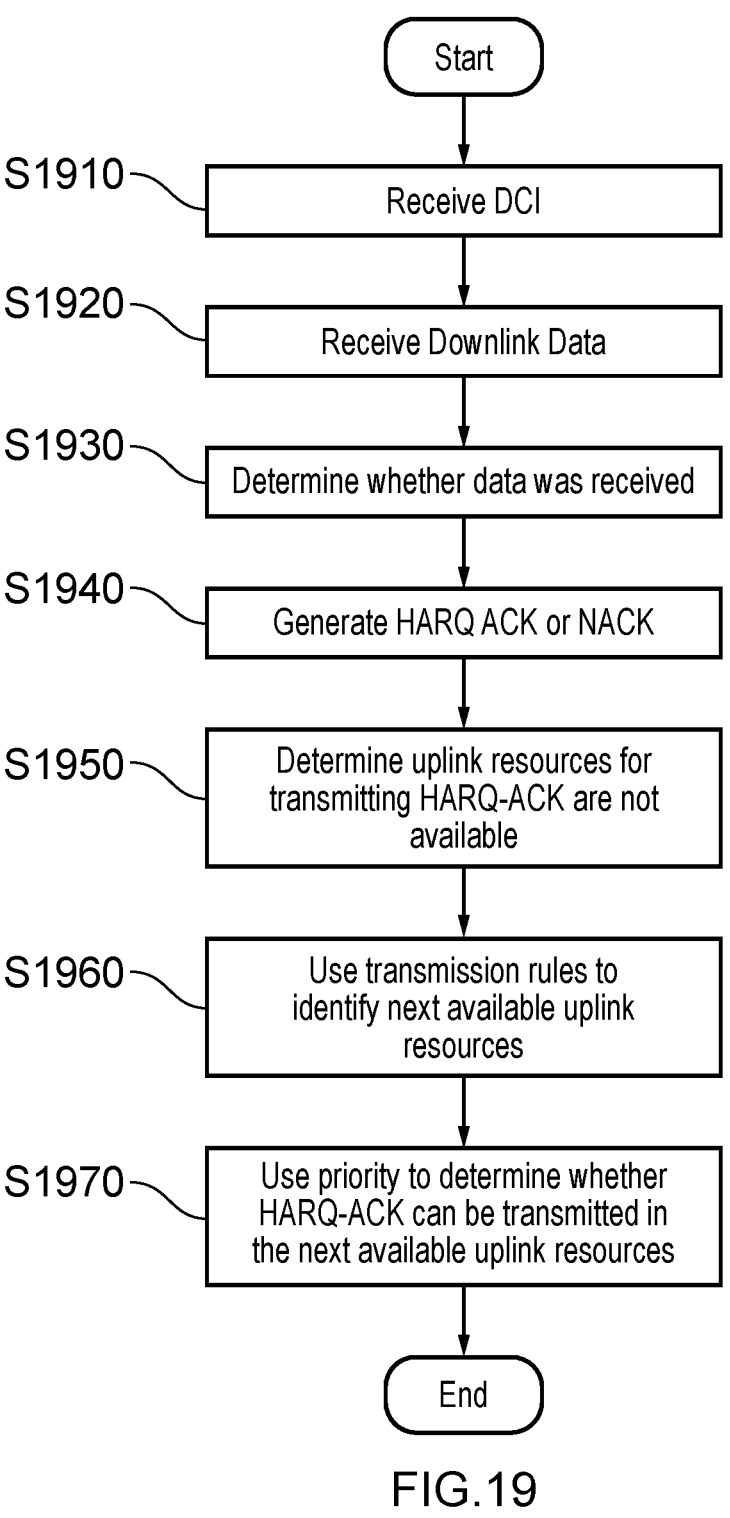
FIG. 19 is a flow diagram illustrating a method performed by a communications device according to exemplary embodiments.

FIG. 19 is a flow diagram illustrating a method performed by a communications device according to exemplary embodiments. FIG. 19 illustrates a method of receiving data at a communications device from a wireless communications network. After a start point, the method proceeds to step S1910 and the communications device receives downlink control information indicating an allocation of downlink communications resources of a wireless access interface provided by the wireless communications network for receiving downlink data, the downlink control information also providing an indication of a relative priority associated with the received downlink data. For example, the downlink control information may allocate PDSCH resources to the communications device for receiving the downlink data. A relative priority may be a 'high' or 'low' Layer 1 priority for example.

In step S1920, the communications device receives the downlink data from the allocated downlink communications resources. For example, the communications device may receive downlink data in allocated PDSCH resources.

In step S1930, the communications device determines whether the downlink data was successfully received.

In step S1940, the communications device generates an automatic repeat request acknowledgement or negative acknowledgement, HARQ-ACK, in accordance with whether or not the downlink data was successfully received. In other words, the communications device generates a HARQ-ACK if the downlink data was successfully received and a HARQ-NACK if the downlink data was not successfully received.

In step S1950, the communications device determines that uplink communications resources for transmitting the HARQ-ACK are not available. For example, the communications device may monitor uplink communications resources and detect that another uplink transmission is occurring. In such examples, the communications device may determine that a listen-before-talk procedure failed.

In step S1960, the communications device uses transmission rules to identify next available uplink communications resources presenting an opportunity for transmitting the HARQ-ACK. In example embodiments, the communications device transmits the missed HARQ-ACK in the next available communications resources. In some embodiments, the communications device decides from two or more uplink transmission opportunities which to use to transmit the missed HARQ-ACK. For example, the communications device may identify first and second uplink communications resources for another first and second uplink transmissions and use the transmissions rules to decide which resources on which to transmit the missed HARQ-ACK.

In step S1970, the communications device uses the indication of the relative priority associated with the received downlink data to determine whether the communications device can transmit the HARQ-ACK in the next available uplink communications resources as the resource opportunity to transmit the HARQ-ACK. In example embodiments, the communications device may determine that the high L1 priority HARQ-ACK may be transmitted in low L1 priority uplink resources. In some embodiments, the communications device may determine that high L1 priority HARQ-ACK may be transmitted in the earliest available uplink resources regardless of the priority of those uplink resources. After step S1970, the method ends.

It will be appreciated that while the above-described examples have focussed on using different times for sending acknowledgement signalling depending on whether the acknowledgement signalling is positive (ACK) or negative (NACK), it will be appreciated the same principles can be applied more generally to using different radio resources (e.g. occurring at/on different times and/or frequencies) for sending acknowledgement signalling depending on whether the acknowledgement signalling is positive (ACK) or negative (NACK). For example, there may be certain frequencies which are systematically more reliable (e.g. due to lower interference) than others, and negative acknowledgement signalling may be sent on the frequencies which are systematically more reliable while positive acknowledgement signalling may be sent on other frequencies, which may be at the same time (since it may be expected reliable delivery of negative acknowledgement signalling is relatively more important). In another example negative acknowledgement signalling may be sent using more radio resources than positive acknowledgement signalling, which may be at the same time, for example to allow for more redundancy to increase the likelihood of reliable transmission (again because it may be considered in some cases that reliable delivery of negative acknowledgement signalling is relatively more important than reliable delivery of positive acknowledgement signalling).

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not of primary significance to the principles of operation described herein.

It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

Respective features of the present disclosure are defined by the following numbered paragraphs:

Paragraph 1. A method of receiving data at a communications device from a wireless communications network, the method comprising receiving, by the communications device, downlink control information indicating an allocation of downlink communications resources of a wireless access interface provided by the wireless communications network for receiving downlink data, the downlink control information also providing an indication of a relative priority associated with the received downlink data, receiving the downlink data from the allocated downlink communications resources, determining, by the communications device, whether the downlink data was successfully received, generating an automatic repeat request acknowledgement or negative acknowledgement, HARQ-ACK, in accordance with whether or not the downlink data was successfully received, determining that uplink communications resources for transmitting the HARQ-ACK are not available, using transmission rules to identify next available uplink communications resources presenting an opportunity for transmitting the HARQ-ACK, and using the indication of the relative priority associated with the received downlink data to determine whether the communications device can transmit the HARQ-ACK in the next available uplink communications resources as the resource opportunity to transmit the HARQ-ACK.

Paragraph 2. A method according to paragraph 1, wherein the determining that uplink communications resources for transmitting the HARQ-ACK are not available comprises identifying from the downlink control information whether uplink communications resources have been allocated for the communications device to transmit the HARQ-ACK with respect to the transmission of the downlink data, and determining that the uplink communications resources have not been allocated for transmitting the HARQ-ACK if the downlink control information indicates that there has not been an allocation of uplink communications resources with respect to the transmission of the downlink data.

Paragraph 3. A method of paragraph 1, wherein the downlink communications resources and the uplink communications resources of the wireless access interface are accessed using a contentious access procedure, and the downlink control information provides an indication of the uplink communications resources for transmitting the HARQ-ACK, and the determining that the uplink communications resources for transmitting the HARQ-ACK are not available comprises determining that the contentious access procedure for accessing the allocated uplink communications resources indicated by the downlink control information has failed or are not allowed according to the contentious access procedure.

Paragraph 4. A method according to any of paragraphs 1 to 3, wherein the using the transmission rules to identify next available uplink communications resources presenting an opportunity for transmitting the HARQ-ACK comprises identifying uplink communications resources which have been assigned for an uplink transmission, determining that a relative priority of the uplink communications resources assigned for the uplink transmission is equal to or lower than the relative priority associated with the received downlink data, identifying the uplink communications resources assigned for the uplink transmission as the next available resource opportunity for transmitting the HARQ-ACK.

Paragraph 5. A method according to paragraph 4, wherein the uplink communications resources which have been assigned for the uplink transmission are uplink communications resources which were allocated by another downlink control information transmission for transmitting a HARQ-ACK for another downlink data transmission, the uplink communications resources forming part of a Physical Uplink Control Channel (PUCCH) and the downlink data transmission using downlink communications resources forming part of a Physical Downlink Shared Channel (PDSCH).

Paragraph 6. A method according to paragraph 4, wherein the uplink communications resources which have been assigned for the uplink transmission are uplink communications resources which have been allocated by another downlink control information transmission for transmitting an uplink data transmission as part of a dynamic grant, the uplink communications resources forming part of a Physical Uplink Shared Channel (PUSCH).

Paragraph 7. A method according to paragraph 4, wherein the uplink communications resources which have been assigned for the uplink transmission are uplink communications resources which have been pre-configured for uplink data transmission as part of a configured grant, the uplink communications resources forming part of a Physical Uplink Shared Channel (PUSCH).

Paragraph 8. A method according to paragraph 4, wherein the uplink communications resources which have been assigned for the uplink transmission are uplink communications resources which have been allocated by another downlink control information transmission, the another downlink control information allocating resources for another downlink transmission containing no data or containing dummy data as part of a dynamic grant, the uplink communications resources forming part of a Physical Uplink Shared Channel (PUSCH).

Paragraph 9. A method according to paragraph 4, wherein the uplink communications resources which have been assigned for the uplink transmission are uplink communications resources which have been allocated by another downlink control information transmission for transmitting a HARQ-ACK in response to the another downlink control information without allocating any downlink resources for another downlink transmission, the uplink communications resources forming part of a Physical Uplink Control Channel (PUCCH).

Paragraph 10. A method according to any of paragraphs 4 to 9, wherein the identifying uplink communications resources which have been assigned for an uplink transmission comprises identifying first and second uplink communications resources which have been assigned for a first and second uplink transmission respectively and the determining that the relative priority of the uplink communications resources assigned for the uplink transmission is equal to or lower than the relative priority of the HARQ-ACK comprises determining that a relative priority of the first uplink communications resources assigned for the first uplink transmission is higher than a relative priority of the second uplink communications resources assigned for the second uplink transmission, and the identifying the uplink communications resources assigned for the uplink transmission as the next available resource opportunity for transmitting the HARQ-ACK comprises identifying the first uplink communications resources assigned for the first uplink transmission as the next available resource opportunity for transmitting the HARQ-ACK and the using the indication of the relative priority associated with the received downlink data to determine whether the communications device can transmit the HARQ-ACK in the next available uplink communications resources as the resource opportunity to transmit the HARQ-ACK comprises determining that the communications device can transmit the HARQ-ACK in the first uplink communications resources if the relative priority associated with the received downlink data is at least as high as the relative priority of the second uplink communications resources.

Paragraph 11 A method according to 10, comprising
determining that the first uplink communications resources assigned for the uplink transmission start at an earlier point in time than the second uplink communications resources assigned for the second uplink transmission.

Paragraph 12. A method according to paragraph 10, comprising
determining that the second uplink communications resources assigned for the second uplink transmission start at an earlier point in time than the first uplink communications resources assigned for the first uplink transmission.

Paragraph 13. A method according to paragraph 10, comprising
determining that the first uplink communications resources assigned for the first uplink transmission start at a same point in time than the second uplink communications resources assigned for the second uplink transmission.

Paragraph 14. A method according to any of paragraphs 4 to 9, wherein the identifying uplink communications resources which have been assigned for an uplink transmission comprises identifying first and second uplink communications resources which have been assigned for a first and second uplink transmission respectively, determining that the first uplink communications resources assigned for the first uplink transmission start at an earlier point in time than the second uplink communications resources assigned for the second uplink transmission, and identifying the first uplink communications resources assigned for the first uplink transmission as the next available resource opportunity for transmitting the HARQ-ACK.

Paragraph 15. A method according to paragraph 14, comprising determining that a relative priority of the first uplink communications resources assigned for the first uplink transmission is higher than a relative priority of the second uplink communications resources assigned for the second uplink transmission the using the indication of the relative priority associated with the received downlink data to determine whether the communications device can transmit the HARQ-ACK in the next available uplink communications resources as the resource opportunity to transmit the HARQ-ACK comprises determining that the communications device can transmit the HARQ-ACK in the first uplink communications resources if the relative priority associated with the received downlink data is at least as high as the relative priority of the second uplink communications resources.

Paragraph 16. A method according to paragraph 14, comprising determining that a relative priority of the second uplink communications resources assigned for the second uplink transmission is higher than a relative priority of the first uplink communications resources assigned for the first uplink transmission and the using the indication of the relative priority associated with the received downlink data to determine whether the communications device can transmit the HARQ-ACK in the next available uplink communications resources as the resource opportunity to transmit the HARQ-ACK comprises determining that the communications device can transmit the HARQ-ACK in the first uplink communications resources if the relative priority associated with the received downlink data is at least as high as the relative priority of the first uplink communications resources.

Paragraph 17. A method according to paragraph 14, comprising determining that a relative priority of the first uplink communications resources assigned for the first uplink transmission and the second uplink resources assigned for the second uplink transmission are both the same or lower than the relative priority of the HARQ-ACK the using the indication of the relative priority associated with the received downlink data to determine whether the communications device can transmit the HARQ-ACK in the next available uplink communications resources as the resource opportunity to transmit the HARQ-ACK comprises determining that the communications device can transmit the HARQ-ACK in the first uplink communications resources if the relative priority associated with the received downlink data is at least as high as the relative priority of the first or second uplink communications resources.

Paragraph 18. A method according to any of paragraphs 4 to 17, wherein the identifying first and second uplink communications resources which have been assigned for a first and second uplink transmission respectively comprises identifying an opportunity time window for candidate resource opportunities, and determining that the first and second communications resources are within the opportunity time window.

Paragraph 19. A method according to any of paragraphs 1 to 3, wherein the using transmission rules to identify next available uplink communications resources presenting an opportunity for transmitting the HARQ-ACK comprises identifying from the downlink control information a group to which the received downlink data transmission belongs;

identifying uplink communications resources which have been allocated by another downlink control information transmission for transmitting a HARQ-ACK for another downlink data transmission, the other downlink control information indicating a group to which the other downlink data transmission belongs;

determining that the group to which the other downlink data transmission belongs is the same as the group for the received downlink data transmission for which the uplink communications resources for transmitting the HARQ-ACK which are not available as indicated, and identifying the uplink communications resources which have been allocated by the another downlink control information for transmitting the HARQ-ACK for the other downlink data transmission as the next available resource opportunity for transmitting the HARQ-ACK.

Paragraph 20. A method according to any of paragraphs 1 to 3, wherein the using transmission rules to identify next available uplink communications resources presenting an opportunity for transmitting the HARQ-ACK comprises identifying from the downlink control information a group to which the received downlink data transmission belongs;

identifying uplink communications resources which have been allocated by another downlink control information transmission for transmitting a HARQ-ACK for another downlink data transmission, the other downlink control information indicating a group to which the other downlink data transmission belongs;

determining that the group to which the other downlink data transmission belongs is different from the group for the received downlink data transmission for which the uplink communications resources for transmitting the HARQ-ACK which are not available as indicated, determining that the relative priority associated with the received downlink data is equal to or greater than a relative priority of the uplink resources which have been allocated by the other downlink control information and identifying the uplink communications resources which have been allocated by the another downlink control information for transmitting the HARQ-ACK for the other downlink data transmission as the next available resource opportunity for transmitting the HARQ-ACK.

Paragraph 21. A method according the paragraph 19 or 20, wherein the group to which the received downlink data transmission and the group to which the another downlink data transmission belongs is one of a first Physical Downlink Shared Channel (PDSCH) group or a second PDSCH group defined in an enhanced Type 2 HARQ-ACK codebook.

Paragraph 22. A method according to any of paragraphs 1 to 21, wherein the receiving, by the communications device, the downlink control information providing the allocation of downlink communications resources and the indication of the relative priority associated with the received downlink data comprises receiving, by the communications device, the downlink control information indicating the allocation of downlink communications resources of the wireless access interface provided by the wireless communications network for receiving the downlink data, the downlink control also providing an indication of a relative priority of the HARQ-ACK, and the using the indication of the relative priority associated with the received downlink data to determine whether the communications device can transmit the HARQ-ACK in the next available uplink communications resources as the resource opportunity to transmit the HARQ-ACK comprises using the indication of the relative priority of the HARQ-ACK to determine whether the communications device can transmit the HARQ-ACK in the next available uplink communications resources as the resource opportunity to transmit the HARQ-ACK.

Paragraph 23. A method according to paragraphs 1 to 22, wherein the indication of the HARQ-ACK is a Layer 1, L1, priority for the HARQ-ACK.

Paragraph 24. A method according to any of paragraphs 1 to 21, wherein the receiving, by the communications device, the downlink control information indicating the allocation of downlink communications resources and providing the indication of the relative priority associated with the received downlink data comprises receiving, by the communications device, the downlink control information indicating the allocation of downlink communications resources of the wireless access interface provided by the wireless communications network for receiving the downlink data, the downlink control also providing an indication of a relative priority with which the received downlink data is communicated, and the using the indication of the relative priority of associated with the received downlink data to determine whether the communications device can transmit the HARQ-ACK in the next available uplink communications resources as the resource opportunity to transmit the HARQ-ACK comprises using the indication of the relative priority with which the downlink data is communicated to determine whether the communications device can transmit the HARQ-ACK in the next available uplink communications resources as the resource opportunity to transmit the HARQ-ACK.

Paragraph 25. A method of transmitting data to one or more communications devices by an infrastructure equipment forming part of a radio access network of a wireless communications network, the method comprising transmitting, to one or more communications devices, downlink control information indicating an allocation of downlink communications resources of the wireless access interface provided by the wireless communications network for receiving downlink data, the downlink control information also providing an indication of a relative priority associated with the received downlink data, transmitting, to the one or more communications devices, the downlink data from the allocated downlink communications resources determining that an automatic repeat request acknowledgement or negative acknowledgement, HARQ-ACK, in accordance with whether or not the downlink data was successfully received at the one or more of the communications devices, was not received at the infrastructure equipment providing, to the one or more communications devices, next available uplink communications resources presenting an opportunity for transmitting the HARQ-ACK.

Paragraph 26. A method according to paragraph 25, wherein the providing, to the one or more communications devices, next available uplink communications resources presenting an opportunity for transmitting the HARQ-ACK comprises providing, to the one or more communications devices, the next available uplink communications resources presenting an opportunity for transmitting the HARQ-ACK in response to the determining that the HARQ-ACK was not received at the infrastructure equipment.

Paragraph 27. A method according to paragraph 26, wherein the uplink communications resources provided to the one or more communications from which the HARQ-ACK was not received have a relative priority at least as high as the priority associated with the received downlink data.

Paragraph 28. A method according to paragraph 26, wherein the providing, to the one or more communications from which the HARQ-ACK was not received, uplink communications resources for transmitting the HARQ-ACK to the infrastructure equipment comprises providing, to the one or more communications from which the HARQ-ACK was not received, the uplink communications resources for transmitting the HARQ-ACK to the infrastructure equipment within a pre-defined time period from the determining that the HARQ-ACK was not received at the infrastructure equipment.

Paragraph 29. A communications device configured to operate in a wireless communications network, the communications device comprising transceiver circuitry configured to transmit signals to the wireless communications network and to receive signals from the wireless communications network via a wireless access interface provided by the wireless communications network; and controller circuitry configured to control the transceiver circuitry, wherein the control circuitry is configured to receive downlink control information indicating an allocation of downlink communications resources of the wireless access interface provided by the wireless communications network for receiving downlink data, the downlink control information also providing an indication of a relative priority associated with the received downlink data, receive the downlink data from the allocated downlink communications resources, determine, by the communications device, whether the downlink data was successfully received, generate an automatic repeat request acknowledgement or negative acknowledgement, HARQ-ACK, in accordance with whether or not the downlink data was successfully received, determine that uplink communications resources for transmitting the HARQ-ACK are not available, use transmission rules to identify next available uplink communications resources presenting an opportunity for transmitting the HARQ-ACK, and use the indication of the relative priority associated with the received downlink data to determine whether the communications device can transmit the HARQ-ACK in the next available uplink communications resources as the resource opportunity to transmit the HARQ-ACK.

Paragraph 30. A communications device according to paragraph 29, wherein the controller circuitry is configured to determine that uplink communications resources for transmitting the HARQ-ACK are not available by identifying from the downlink control information whether uplink communications resources have been allocated for the communications device to transmit the HARQ-ACK with respect to the transmission of the downlink data, and determining that the uplink communications resources have not been allocated for transmitting the HARQ-ACK if the downlink control information indicates that there has not been an allocation of uplink communications resources with respect to the transmission of the downlink data.

Paragraph 31. A communications device of paragraph 29, wherein the downlink communications resources and the uplink communications resources of the wireless access interface are accessed using a contentious access procedure, and the downlink control information provides an indication of the uplink communications resources for transmitting the HARQ-ACK, and the determining that the uplink communications resources for transmitting the HARQ-ACK are not available comprises determining that the contentious access procedure for accessing the allocated uplink communications resources indicated by the downlink control information has failed or are not allowed according to the contentious access procedure.

Paragraph 32. A communications device according to any of paragraphs 29 to 31, wherein the controller circuitry is configured to use the transmission rules to identify next available uplink communications resources presenting an opportunity for transmitting the HARQ-ACK by identifying uplink communications resources which have been assigned for an uplink transmission, determining that a relative priority of the uplink communications resources assigned for the uplink transmission is equal to or lower than the relative priority associated with the received downlink data, identifying the uplink communications resources assigned for the uplink transmission as the next available resource opportunity for transmitting the HARQ-ACK.

Paragraph 33. A communications device according to paragraph 32, wherein the uplink communications resources which have been assigned for the uplink transmission are uplink communications resources which were allocated by another downlink control information transmission for transmitting a HARQ-ACK for another downlink data transmission, the uplink communications resources forming part of a Physical Uplink Control Channel (PUCCH) and the downlink data transmission using downlink communications resources forming part of a Physical Downlink Shared Channel (PDSCH).

Paragraph 34. A communications device according to paragraph 32, wherein the uplink communications resources which have been assigned for the uplink transmission are uplink communications resources which have been allocated by another downlink control information transmission for transmitting an uplink data transmission as part of a dynamic grant, the uplink communications resources forming part of a Physical Uplink Shared Channel (PUSCH).

Paragraph 35. A communications device according to paragraph 32, wherein the uplink communications resources which have been assigned for the uplink transmission are uplink communications resources which have been pre-configured for uplink data transmission as part of a configured grant, the uplink communications resources forming part of a Physical Uplink Shared Channel (PUSCH).

Paragraph 36. A communications device according to paragraph 32, wherein the uplink communications resources which have been assigned for the uplink transmission are uplink communications resources which have been allocated by another downlink control information transmission, the another downlink control information allocating resources for another downlink transmission containing no data or containing dummy data as part of a dynamic grant, the uplink communications resources forming part of a Physical Uplink Shared Channel (PUSCH).

Paragraph 37. A communications device according to paragraph 32, wherein the uplink communications resources which have been assigned for the uplink transmission are uplink communications resources which have been allocated by another downlink control information transmission for transmitting a HARQ-ACK in response to the another downlink control information without allocating any downlink resources for another downlink transmission, the uplink communications resources forming part of a Physical Uplink Control Channel (PUCCH).

Paragraph 38. A communications device according to any of paragraphs 32 to 36, wherein the controller circuitry is configured to identify uplink communications resources which have been assigned for an uplink transmission by identifying first and second uplink communications resources which have been assigned for a first and second uplink transmission respectively and the determining that the relative priority of the uplink communications resources assigned for the uplink transmission is equal to or lower than the relative priority of the HARQ-ACK comprises determining that a relative priority of the first uplink communications resources assigned for the first uplink transmission is higher than a relative priority of the second uplink communications resources assigned for the second uplink transmission, and the identifying the uplink communications resources assigned for the uplink transmission as the next available resource opportunity for transmitting the HARQ-ACK comprises identifying the first uplink communications resources assigned for the first uplink transmission as the next available resource opportunity for transmitting the HARQ-ACK and the using the indication of the relative priority associated with the received downlink data to determine whether the communications device can transmit the HARQ-ACK in the next available uplink communications resources as the resource opportunity to transmit the HARQ-ACK comprises determining that the communications device can transmit the HARQ-ACK in the first uplink communications resources if the relative priority associated with the received downlink data is at least as high as the relative priority of the second uplink communications resources.

Paragraph 39. A communications device according to 38, wherein the controller circuitry is configured to determine that the first uplink communications resources assigned for the uplink transmission start at an earlier point in time than the second uplink communications resources assigned for the second uplink transmission.

Paragraph 40. A communications device according to paragraph 38, wherein the controller circuitry is configured to determine that the second uplink communications resources assigned for the second uplink transmission start at an earlier point in time than the first uplink communications resources assigned for the first uplink transmission.

Paragraph 41. A communications device according to paragraph 38, wherein the controller circuitry is configured to determine that the first uplink communications resources assigned for the first uplink transmission start at a same point in time than the second uplink communications resources assigned for the second uplink transmission.

Paragraph 42. A communications device according to any of paragraphs 32 to 36, wherein the controller circuitry is configured to identify uplink communications resources which have been assigned for an uplink transmission by identifying first and second uplink communications resources which have been assigned for a first and second uplink transmission respectively, determining that the first uplink communications resources assigned for the first uplink transmission start at an earlier point in time than the second uplink communications resources assigned for the second uplink transmission, and identifying the first uplink communications resources assigned for the first uplink transmission as the next available resource opportunity for transmitting the HARQ-ACK.

Paragraph 43. A communications device according to paragraph 42, wherein the controller circuitry is configured to determine that a relative priority of the first uplink communications resources assigned for the first uplink transmission is higher than a relative priority of the second uplink communications resources assigned for the second uplink transmission the using the indication of the relative priority associated with the received downlink data to determine whether the communications device can transmit the HARQ-ACK in the next available uplink communications resources as the resource opportunity to transmit the HARQ-ACK comprises determining that the communications device can transmit the HARQ-ACK in the first uplink communications resources if the relative priority associated with the received downlink data is at least as high as the relative priority of the second uplink communications resources.

Paragraph 44. A communications device according to paragraph 42, wherein the controller circuitry is configured to determine that a relative priority of the second uplink communications resources assigned for the second uplink transmission is higher than a relative priority of the first uplink communications resources assigned for the first uplink transmission and the using the indication of the relative priority associated with the received downlink data to determine whether the communications device can transmit the HARQ-ACK in the next available uplink communications resources as the resource opportunity to transmit the HARQ-ACK comprises determining that the communications device can transmit the HARQ-ACK in the first uplink communications resources if the relative priority associated with the received downlink data is at least as high as the relative priority of the first uplink communications resources.

Paragraph 45. A communications device according to paragraph 42, wherein the controller circuitry is configured to determine that a relative priority of the first uplink communications resources assigned for the first uplink transmission and the second uplink resources assigned for the second uplink transmission are both the same or lower than the relative priority of the HARQ-ACK the using the indication of the relative priority associated with the received downlink data to determine whether the communications device can transmit the HARQ-ACK in the next available uplink communications resources as the resource opportunity to transmit the HARQ-ACK comprises determine that the communications device can transmit the HARQ-ACK in the first uplink communications resources if the relative priority associated with the received downlink data is at least as high as the relative priority of the first or second uplink communications resources.

Paragraph 46. A communications device according to any of paragraphs 31 to 45, wherein the controller circuitry is configured to identify first and second uplink communications resources which have been assigned for a first and second uplink transmission respectively by identifying an opportunity time window for candidate resource opportunities, and determining that the first and second communications resources are within the opportunity time window.

Paragraph 47. A communications device according to any of paragraphs 29 to 31, wherein the controller circuitry is configured to the use the transmission rules to identify next available uplink communications resources presenting an opportunity for transmitting the HARQ-ACK by identifying from the downlink control information a group to which the received downlink data transmission belongs;

identifying uplink communications resources which have been allocated by another downlink control information transmission for transmitting a HARQ-ACK for another downlink data transmission, the other downlink control information indicating a group to which the other downlink data transmission belongs;

determining that the group to which the other downlink data transmission belongs is the same as the group for the received downlink data transmission for which the uplink communications resources for transmitting the HARQ-ACK which are not available as indicated, and identifying the uplink communications resources which have been allocated by the another downlink control information for transmitting the HARQ-ACK for the other downlink data transmission as the next available resource opportunity for transmitting the HARQ-ACK.

Paragraph 48. A communications device according to any of paragraphs 29 to 31, wherein the controller circuitry is configured to use the transmission rules to identify next available uplink communications resources presenting an opportunity for transmitting the HARQ-ACK by identifying from the downlink control information a group to which the received downlink data transmission belongs;

identifying uplink communications resources which have been allocated by another downlink control information transmission for transmitting a HARQ-ACK for another downlink data transmission, the other downlink control information indicating a group to which the other downlink data transmission belongs;

determining that the group to which the other downlink data transmission belongs is different from the group for the received downlink data transmission for which the uplink communications resources for transmitting the HARQ-ACK which are not available as indicated, determining that the relative priority associated with the received downlink data is equal to or greater than a relative priority of the uplink resources which have been allocated by the other downlink control information and identifying the uplink communications resources which have been allocated by the another downlink control information for transmitting the HARQ-ACK for the other downlink data transmission as the next available resource opportunity for transmitting the HARQ-ACK.

Paragraph 49. A communications device according the paragraph 47 or 48, wherein the group to which the received downlink data transmission and the group to which the another downlink data transmission belongs is one of a first Physical Downlink Shared Channel (PDSCH) group or a second PDSCH group defined in an enhanced Type 2 HARQ-ACK codebook.

Paragraph 50. A communications device according to any of paragraphs 29 to 49, wherein the controller circuitry is configured in combination with the transceiver circuitry to receive, by the communications device, the downlink control information providing the allocation of downlink communications resources and the indication of the relative priority associated with the received downlink data by receiving, by the communications device, the downlink control information indicating the allocation of downlink communications resources of the wireless access interface provided by the wireless communications network for receiving the downlink data, the downlink control also providing an indication of a relative priority of the HARQ-ACK, and the using the indication of the relative priority associated with the received downlink data to determine whether the communications device can transmit the HARQ-ACK in the next available uplink communications resources as the resource opportunity to transmit the HARQ-ACK comprises using the indication of the relative priority of the HARQ-ACK to determine whether the communications device can transmit the HARQ-ACK in the next available uplink communications resources as the resource opportunity to transmit the HARQ-ACK.

Paragraph 51. A communications device according to paragraphs 29 to 50, wherein the indication of the HARQ-ACK is a Layer 1, L1, priority for the HARQ-ACK.

Paragraph 52. A communications device according to any of paragraphs 29 to 50, wherein the controller circuitry is configured in combination with the transceiver circuitry to receive, by the communications device, the downlink control information providing the allocation of downlink communications resources and the indication of the relative priority associated with the received downlink data by receiving, by the communications device, the downlink control information indicating the allocation of downlink communications resources of the wireless access interface provided by the wireless communications network for receiving the downlink data, the downlink control also providing an indication of a relative priority with which the received downlink data is communicated, and the using the indication of the relative priority of associated with the received downlink data to determine whether the communications device can transmit the HARQ-ACK in the next available uplink communications resources as the resource opportunity to transmit the HARQ-ACK comprises using the indication of the relative priority with which the downlink data is communicated to determine whether the communications device can transmit the HARQ-ACK in the next available uplink communications resources as the resource opportunity to transmit the HARQ-ACK.

Paragraph 53. An infrastructure equipment forming part of a radio access network of a wireless communications network, the infrastructure equipment comprising transceiver circuitry configured to transmit signals to one or more communications devices and to receive signals from the one or more communications devices via a wireless access interface provided by the wireless communications network; and controller circuitry configured to control the transceiver circuitry, wherein the control circuitry is configured to transmit, to one or more communications devices, downlink control information indicating an allocation of downlink communications resources of the wireless access interface provided by the wireless communications network for receiving downlink data, the downlink control information also providing an indication of a relative priority associated with the received downlink data, transmit, to the one or more communications devices, the downlink data from the allocated downlink communications resources determine that an automatic repeat request acknowledgement or negative acknowledgement, HARQ-ACK, in accordance with whether or not the downlink data was successfully received at the one or more of the communications devices, was not received at the infrastructure equipment provide, to the one or more communications devices, next available uplink communications resources presenting an opportunity for transmitting the HARQ-ACK.

Paragraph 54. An infrastructure equipment according to paragraph 53, wherein the controller circuitry is configured in combination with the transmitter circuitry to provide, to the one or more communications devices, the next available uplink communications resources presenting an opportunity for transmitting the HARQ-ACK by providing, to the one or more communications devices, the next available uplink communications resources presenting an opportunity for transmitting the HARQ-ACK in response to the determining that the HARQ-ACK was not received at the infrastructure equipment.

Paragraph 55. An infrastructure equipment according to paragraph 54, wherein the uplink communications resources provided to the one or more communications from which the HARQ-ACK was not received have a relative priority at least as high as the priority associated with the received downlink data.

Paragraph 56. An infrastructure equipment according to paragraph 54, wherein the controller circuitry is configured in combination with the transmitter circuitry to provide, to the one or more communications from which the HARQ-ACK was not received, uplink communications resources for transmitting the HARQ-ACK to the infrastructure equipment by providing, to the one or more communications from which the HARQ-ACK was not received, the uplink communications resources for transmitting the HARQ-ACK to the infrastructure equipment within a predefined time period from the determining that the HARQ-ACK was not received at the infrastructure equipment.

Paragraph 57. A communications device including transceiver circuitry and control circuitry including a processor for executing computer executable code, and when the computer executable code is executed the processor performs the method according to paragraph 1.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP document RP-160671, "New SID Proposal: Study on New Radio Access Technology," NTT DOCOMO, RAN #71, Gothenburg, Sweden, 7 to 10 Mar. 2016

[2] 3GPP document RP-172834, "Work Item on New Radio (NR) Access Technology," NTT DOCOMO, RAN #78, Lisbon, Portugal, 18 to 21 Dec. 2017

[3] 3GPP document RP-182089, "New SID on Physical Layer Enhancements for NR Ultra-Reliable and Low Latency Communication (URLLC)," Huawei, HiSilicon, Nokia, Nokia Shanghai Bell, RAN #81, Gold Coast, Australia, 10 to 13 Sep. 2018

[4] 3GPP document RP-190654, "New WID: Physical layer enhancements for NR ultra-reliable and low latency communication (URLLC)," Huawei, HiSilicon, RAN #83, Shenzhen, China, 18 to 21 Mar. 2019

[5] TR38.913, "Study on Scenarios and Requirements for Next Generation Access Technologies (Release 14)", v14.3.0

[6] RP-190726, "Physical layer enhancements for NR ultra-reliable and low latency communication (URLLC)," Huawei, HiSilicon, RAN #83

[7] RP-193233, "Enhanced Industrial Internet of Things (IoT) and URLLC support," Nokia, Nokia Shanghai Bell, RAN #86

[8] RP-191575, "NR-based Access to Unlicensed Spectrum," Qualcomm, RAN #84

[9] R1-2003845, "Feature lead summary #2 on 101-e-NR-unlic-NRU-HARQ-03 (NNK1 value)," Huawei, RAN1 #101e

[10] TS38.212, "NR: Multiplexing and channel coding (Release 16)" v16.1.0

[11] Holma H. and Toskala A, "LTE for UMTS OFDMA and SC-FDMA based radio access", John Wiley and Sons, 2009

What is claimed is:

1. A method of receiving data at a communications device from a wireless communications network, the method comprising receiving, by the communications device, downlink control information indicating an allocation of downlink communications resources of a wireless access interface provided by the wireless communications network for receiving downlink data, the downlink control information also providing an indication of a relative priority associated with the received downlink data, receiving the downlink data from the allocated downlink communications resources, determining, by the communications device, whether the downlink data was successfully received, generating an automatic repeat request acknowledgement or negative acknowledgement, HARQ-ACK, in accordance with whether or not the downlink data was successfully received, determining that uplink communications resources for transmitting the HARQ-ACK are not available, using transmission rules to identify next available uplink communications resources presenting an opportunity for transmitting the HARQ-ACK, and using the indication of the relative priority associated with the received downlink data to determine whether the communications device can transmit the HARQ-ACK in the next available uplink communications resources as the resource opportunity to transmit the HARQ-ACK.

2. A method according to claim 1, wherein the determining that uplink communications resources for transmitting the HARQ-ACK are not available comprises identifying from the downlink control information whether uplink communications resources have been allocated for the communications device to transmit the HARQ-ACK with respect to the transmission of the downlink data, and determining that the uplink communications resources have not been allocated for transmitting the HARQ-ACK if the downlink control information indicates that there has not been an allocation of uplink communications resources with respect to the transmission of the downlink data.

3. A method of claim 1, wherein the downlink communications resources and the uplink communications resources of the wireless access interface are accessed using a contentious access procedure, and the downlink control information provides an indication of the uplink communications resources for transmitting the HARQ-ACK, and the determining that the uplink communications resources for transmitting the HARQ-ACK are not available comprises determining that the contentious access procedure for accessing the allocated uplink communications resources indicated by the downlink control information has failed or are not allowed according to the contentious access procedure.

4. A method according to claim 1, wherein the using the transmission rules to identify next available uplink communications resources presenting an opportunity for transmitting the HARQ-ACK comprises identifying uplink communications resources which have been assigned for an uplink transmission, determining that a relative priority of the uplink communications resources assigned for the uplink transmission is equal to or lower than the relative priority associated with the received downlink data, identifying the uplink communications resources assigned for the uplink transmission as the next available resource opportunity for transmitting the HARQ-ACK.

5. A method according to claim 4, wherein the uplink communications resources which have been assigned for the uplink transmission are uplink communications resources which were allocated by another downlink control information transmission for transmitting a HARQ-ACK for another downlink data transmission, the uplink communications resources forming part of a Physical Uplink Control Channel (PUCCH) and the downlink data transmission using downlink communications resources forming part of a Physical Downlink Shared Channel (PDSCH).

6. A method according to claim 4, wherein the uplink communications resources which have been assigned for the uplink transmission are uplink communications resources which have been allocated by another downlink control information transmission for transmitting an uplink data transmission as part of a dynamic grant, the uplink communications resources forming part of a Physical Uplink Shared Channel (PUSCH).

7. A method according to claim 4, wherein the uplink communications resources which have been assigned for the uplink transmission are uplink communications resources which have been pre-configured for uplink data transmission as part of a configured grant, the uplink communications resources forming part of a Physical Uplink Shared Channel (PUSCH).

8. A method according to claim 4, wherein the uplink communications resources which have been assigned for the uplink transmission are uplink communications resources which have been allocated by another downlink control information transmission, the another downlink control information allocating resources for another downlink transmission containing no data or containing dummy data as part of a dynamic grant, the uplink communications resources forming part of a Physical Uplink Shared Channel (PUSCH).

9. A method according to claim 4, wherein the uplink communications resources which have been assigned for the uplink transmission are uplink communications resources which have been allocated by another downlink control information transmission for transmitting a HARQ-ACK in response to the another downlink control information without allocating any downlink resources for another downlink transmission, the uplink communications resources forming part of a Physical Uplink Control Channel (PUCCH).

10. A method according to claim 4, wherein the identifying uplink communications resources which have been assigned for an uplink transmission comprises identifying first and second uplink communications resources which have been assigned for a first and second uplink transmission respectively and the determining that the relative priority of the uplink communications resources assigned for the uplink transmission is equal to or lower than the relative priority of the HARQ-ACK comprises determining that a relative priority of the first uplink communications resources assigned for the first uplink transmission is higher than a relative priority of the second uplink communications resources assigned for the second uplink transmission, and the identifying the uplink communications resources assigned for the uplink transmission as the next available resource opportunity for transmitting the HARQ-ACK comprises identifying the first uplink communications resources assigned for the first uplink transmission as the next available resource opportunity for transmitting the HARQ-ACK and the using the indication of the relative priority associated with the received downlink data to determine whether the communications device can transmit the HARQ-ACK in the next available uplink communications resources as the resource opportunity to transmit the HARQ-ACK comprises determining that the communications device can transmit the HARQ-ACK in the first uplink communications resources if the relative priority associated with the received downlink data is at least as high as the relative priority of the second uplink communications resources.

11. A method according to claim 10, comprising determining that the first uplink communications resources assigned for the uplink transmission start at an earlier point in time than the second uplink communications resources assigned for the second uplink transmission.

12. A method according to claim 10, comprising determining that the second uplink communications resources assigned for the second uplink transmission start at an earlier point in time than the first uplink communications resources assigned for the first uplink transmission.

13. A method according to claim 10, comprising determining that the first uplink communications resources assigned for the first uplink transmission start at a same point in time than the second uplink communications resources assigned for the second uplink transmission.

14. A method according to claim 4, wherein the identifying uplink communications resources which have been assigned for an uplink transmission comprises identifying first and second uplink communications resources which have been assigned for a first and second uplink transmission respectively, determining that the first uplink communications resources assigned for the first uplink transmission start at an earlier point in time than the second uplink communications resources assigned for the second uplink transmission, and identifying the first uplink communications resources assigned for the first uplink transmission as the next available resource opportunity for transmitting the HARQ-ACK.

15. A method of transmitting data to one or more communications devices by an infrastructure equipment forming part of a radio access network of a wireless communications network, the method comprising transmitting, to one or more communications devices, downlink control information indicating an allocation of downlink communications resources of the wireless access interface provided by the wireless communications network for receiving downlink data, the downlink control information also providing an indication of a relative priority associated with the received downlink data, transmitting, to the one or more communications devices, the downlink data from the allocated downlink communications resources determining that an automatic repeat request acknowledgement or negative acknowledgement, HARQ-ACK, in accordance with whether or not the downlink data was successfully received at the one or more of the communications devices, was not received at the infrastructure equipment providing, to the one or more communications devices, next available uplink communications resources presenting an opportunity for transmitting the HARQ-ACK in response to the determining that the HARQ-ACK was not received at the infrastructure equipment.

16. A method according to claim 15, wherein the uplink communications resources provided to the one or more communications from which the HARQ-ACK was not received have a relative priority at least as high as the priority associated with the received downlink data.

17. A method according to claim 15, wherein the providing, to the one or more communications from which the HARQ-ACK was not received, uplink communications resources for transmitting the HARQ-ACK to the infrastructure equipment comprises providing, to the one or more communications from which the HARQ-ACK was not received, the uplink communications resources for transmitting the HARQ-ACK to the infrastructure equipment within a predefined time period from the determining that the HARQ-ACK was not received at the infrastructure equipment.

18. An infrastructure equipment forming part of a radio access network of a wireless communications network, the infrastructure equipment comprising transceiver circuitry configured to transmit signals to one or more communications devices and to receive signals from the one or more communications devices via a wireless access interface provided by the wireless communications network; and controller circuitry configured to control the transceiver circuitry, wherein the control circuitry is configured to transmit, to one or more communications devices, downlink control information indicating an allocation of downlink communications resources of the wireless access interface provided by the wireless communications network for receiving downlink data, the downlink control information also providing an indication of a relative priority associated with the received downlink data, transmit, to the one or more communications devices, the downlink data from the allocated downlink communications resources determine that an automatic repeat request acknowledgement or negative acknowledgement, HARQ-ACK, in accordance with whether or not the downlink data was successfully received at the one or more of the communications devices, was not received at the infrastructure equipment provide, to the one or more communications devices, next available uplink communications resources presenting an opportunity for transmitting the HARQ-ACK in response to the determining that the HARQ-ACK was not received at the infrastructure equipment.

* * * * *